(12) United States Patent
Bargeron et al.

(10) Patent No.: US 8,091,021 B2
(45) Date of Patent: Jan. 3, 2012

(54) FACILITATING ADAPTIVE GRID-BASED DOCUMENT LAYOUT

(75) Inventors: David Bargeron, Seattle, WA (US); Charles Edward Jacobs, Seattle, WA (US); Wilmot Wei-Mau Li, Seattle, WA (US); David Salesin, Seattle, WA (US); Evan Joseph Schrier, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 11/778,584

(22) Filed: Jul. 16, 2007

(65) Prior Publication Data

US 2008/0022197 A1 Jan. 24, 2008

Related U.S. Application Data

(62) Division of application No. 10/768,993, filed on Jan. 30, 2004, now Pat. No. 7,246,311.

(51) Int. Cl.
*G06F 3/00* (2006.01)

(52) U.S. Cl. ......... 715/247; 715/243; 715/252; 715/253

(58) Field of Classification Search .................. 715/200, 715/201, 204, 209, 221, 226, 243, 247, 252, 715/253

See application file for complete search history.

(56) References Cited

U.S. PATENT DOCUMENTS

| | | | |
|---|---|---|---|
| 4,916,624 A * | 4/1990 | Collins et al. ................. | 700/132 |
| 5,060,155 A | 10/1991 | van Zuijlen | |
| 5,347,295 A | 9/1994 | Agulnick et al. | |
| 5,594,809 A * | 1/1997 | Kopec et al. ................. | 382/161 |
| 5,625,833 A | 4/1997 | Levine et al. | |
| 5,668,966 A | 9/1997 | Ono et al. | |
| 5,689,620 A * | 11/1997 | Kopec et al. ................. | 706/12 |
| 5,706,364 A * | 1/1998 | Kopec et al. ................. | 382/159 |
| 5,724,455 A * | 3/1998 | Eschbach ................. | 382/260 |
| 5,764,951 A * | 6/1998 | Ly et al. ................. | 716/103 |
| 5,809,171 A * | 9/1998 | Neff et al. ................. | 382/209 |
| 5,864,805 A | 1/1999 | Chen et al. | |
| 5,883,986 A * | 3/1999 | Kopec et al. ................. | 382/310 |
| 5,909,667 A | 6/1999 | Leontiades et al. | |

(Continued)

OTHER PUBLICATIONS

Badros, G. J., A. Borning, K. Marriott, and P. Stuckey, Constraint cascading style sheets for the Web, Proc. of the 12th Annual ACM Symposium on User Interface Software and Tech., Aug. 1999, pp. 73-82, ACM, New York, NY, USA.

(Continued)

*Primary Examiner* — Stephen Hong
*Assistant Examiner* — Gregory J Vaughn
(74) *Attorney, Agent, or Firm* — Lyon & Harr, L.L.P.; Craig S. Fischer

(57) ABSTRACT

A system and methods for facilitating adaptive grid-based document layout. More particularly, the adaptive grid-based document layout system and methods feature a new approach to adaptive grid-based document layout that utilizes a set of adaptive templates that are configurable in a range of different pages sizes and viewing conditions. The templates include various element types and constraint-based relationships that define the layout of elements with reference to viewing conditions under which the document content will be displayed and that define other content properties. Through a layout engine and paginator, the adaptive grid-based document layout system and methods determines a desirable sequence of templates to use for adapting document content. Additionally, the adaptive grid-based document layout system and methods provides a template authoring tool and user interface for interactively drawing and arranging layout elements within an adaptive template.

20 Claims, 19 Drawing Sheets

U.S. PATENT DOCUMENTS

Figure 1:
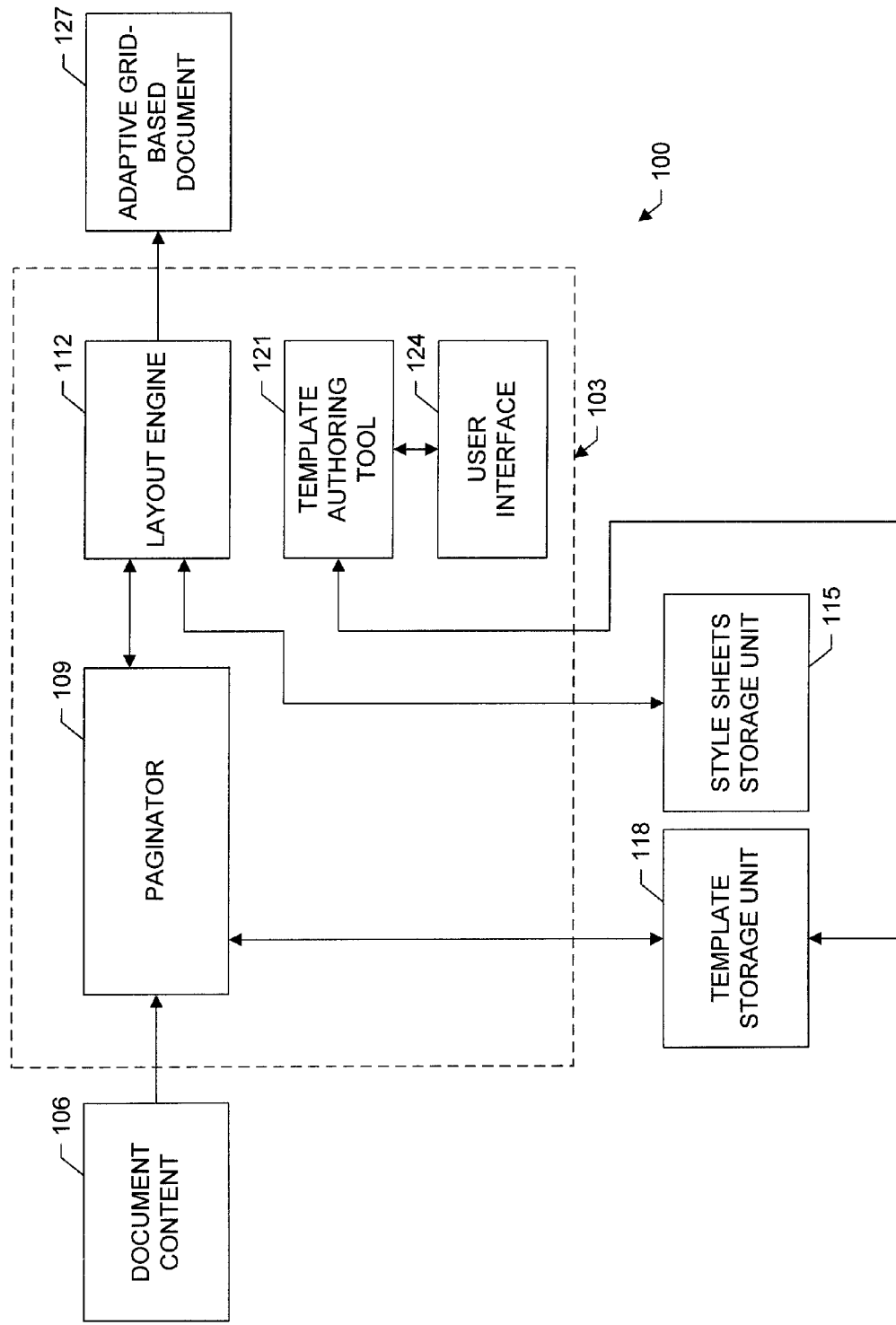

| | | | |
|---|---|---|---|
| 5,946,422 A * | 8/1999 | Neff et al. | 382/278 |
| 5,956,419 A * | 9/1999 | Kopec et al. | 382/159 |
| 6,163,785 A | 12/2000 | Carbonell et al. | |
| 6,185,592 B1 * | 2/2001 | Boguraev et al. | 715/256 |
| 6,381,372 B1 * | 4/2002 | Loce | 382/261 |
| 6,424,979 B1 | 7/2002 | Livingston et al. | |
| 6,430,624 B1 | 8/2002 | Jamtgaard et al. | |
| 6,616,702 B1 | 9/2003 | Tonkin | |
| 6,751,341 B2 * | 6/2004 | Oosawa | 382/132 |
| 6,825,844 B2 | 11/2004 | Hill et al. | |
| 6,857,102 B1 | 2/2005 | Bickmore et al. | |
| 6,865,294 B2 * | 3/2005 | Sato | 382/169 |
| 7,089,490 B1 | 8/2006 | Tan et al. | |
| 2001/0009423 A1 * | 7/2001 | Davis et al. | 345/723 |
| 2001/0021928 A1 | 9/2001 | Ludwig et al. | |
| 2001/0054049 A1 | 12/2001 | Maeda et al. | |
| 2002/0015042 A1 * | 2/2002 | Robotham et al. | 345/581 |
| 2002/0016801 A1 | 2/2002 | Reiley et al. | |
| 2003/0004836 A1 | 1/2003 | Otter et al. | |
| 2003/0101164 A1 | 5/2003 | Pic et al. | |
| 2003/0133693 A1 * | 7/2003 | Collins et al. | 386/52 |
| 2003/0169343 A1 * | 9/2003 | Kagaya et al. | 348/207.1 |
| 2003/0229845 A1 * | 12/2003 | Salesin et al. | 715/500 |
| 2004/0034520 A1 | 2/2004 | Langkilde-Geary et al. | |
| 2004/0034651 A1 | 2/2004 | Gupta et al. | |
| 2004/0078190 A1 | 4/2004 | Fass et al. | |
| 2004/0186705 A1 | 9/2004 | Morgan et al. | |
| 2005/0102628 A1 | 5/2005 | Salesin et al. | |

OTHER PUBLICATIONS

Borning, A., R. Lin, K. Marriott, Constraints for the web, Proc. of the Fifth ACM Int'l Conf. on Multimedia, Nov. 1997, pp. 173-182, ACM, New York, NY, USA.

Borning, A., R. Kuang-Hsu Lin, K. Marriott, Constraint-based document layout for the Web Multimedia Systems, Oct. 2000, pp. 177-189, vol. 8, No. 3, Springer-Verlag New York, Inc. Secaucus, NJ, USA.

Borning, A., K. Marriott, P. Stuckey, and Y. Xiao, Solving linear arithmetic constraints for user interface applications, Proc. of the 10th Annual ACM Symposium on User Interface Software and Tech., Oct. 1997, pp. 87-96, ACM, New York, NY, USA.

Furuta, R., J. Scofield, A. Shaw, Document formatting systems: Survey, concepts, and issues, ACM Computing Surveys (CSUR), Sep. 1982, pp. 417-472, vol. 14, No. 3, ACM, New York, NY, USA.

Johari, R., J. Marks, A. Partovi, and S. Shieber, Automatic yellow-pages pagination and layout, J. of Heuristics, Mar. 1997, pp. 321-342, vol. 2, No. 4, Springer-Verlag New York, Inc. Secaucus, N.J., USA.

Knuth, D. E. and M. F. Plass, Breaking paragraphs into lines, Software—Practice and Experience, Nov. 1981, pp. 1119-1184, vol. 11, No. 11, Addison-Wesley Publishing Company.

Peels, A. J. H., N. J. M. Janssen, W. Nawijn, Document architecture and text formatting, ACM Transactions on Information Systems, Oct. 1985, vol. 3, No. 4, pp. 347-369, ACM, New York, NY, USA.

Weitzman, L., K. Wittenburg, Automatic presentation of multimedia documents using relational grammars, Proc. of the Second ACM Int'l Conf. on Multimedia, Oct. 1994, pp. 443-451, ACM New York, NY, USA.

Microsoft Word 2002, copyright 2001, p. 1-15.

Thu V. Huynh, U.S. Appl. No. 10/159,627, U.S. Notice of Allowance, Dec. 28, 2005.

Thu V. Huynh, U.S. Appl. No. 10/159,627, U.S. Office Action, Aug. 15, 2005.

Thu V. Huynh, U.S. Appl. No. 10/159,627, U.S. Office Action, Mar. 8, 2005.

Thu V. Huynh, U.S. Appl. No. 11/145,070, U.S. Notice of Allowance, May 1, 2009.

Thu V. Huynh, U.S. Appl. No. 11/145,070, U.S. Final Office Action, Oct. 15, 2008.

Thu V. Huynh, U.S. Appl. No. 11/145,070, U.S. Office Action, Mar. 21, 2008.

Thu V. Huynh, U.S. Appl. No. 11/942,681, U.S. Final Office Action, Apr. 1, 2010.

Thu V. Huynh, U.S. Appl. No. 11/942,681, U.S. Office Action, Oct. 15, 2009.

Thu V. Huynh, U.S. Appl. No. 11/942,681, U.S. Final Office Action, Jul. 8, 2009.

Thu V. Huynh, U.S. Appl. No. 11/942,681, U.S. Office Action, Jan. 7, 2009.

Badros, G. J., J. Nichols, A. Borning, SCWM: An intelligent constraint-enabled window manager, Mar. 2000, Proc. of the American Association for Artificial Intelligence Spring Symposium on Smart Graphics, pp. 1-8.

* cited by examiner

FACILITATING ADAPTIVE GRID-BASED DOCUMENT LAYOUT

CROSS REFERENCE TO RELATED APPLICATIONS

This patent application is a divisional application of U.S. Ser. No. 10/768,993, entitled "A System and Method for Facilitating Adaptive Grid-Based Document Layout," filed Jan. 30, 2004, now U.S. Pat. No. 7,246,311, issued on Jul. 17, 2007, which claims priority to U.S. Provisional Patent Application assigned Ser. No. 60/488,169, entitled "Adaptive Grid-Based Document Layout," and filed on Jul. 17, 2003, which are incorporated by reference in their entirety as if fully set forth herein.

BACKGROUND

Commercially printed publications, such as newspapers and magazines, significantly use grid-based page layouts and designs. In the 1920s and 1940s, designers Mondrian and Le Corbusier created ordered grid-based design systems for printing various types of document content. These grid-based design systems were further improved in Switzerland after World War II and, in the 1950s and 1960s, rapidly spread throughout the world as the standard for commercial publications. Today, grid-based design systems remain universally implemented in a variety of publication systems.

Several successful software systems exist that support grid-based page designs. Products such as MICROSOFT PUBLISHER offered by Microsoft Corporation of Redmond, Wash., QUARKXPRESS® offered by Quark, Inc. of Denver, Colo., and ADOBE PAGEMAKER® offered by Adobe Systems Incorporated of San Jose, Calif. have become the industry standards for commercial publishing and desktop publishing. Although these software systems are adequate for their intended purpose, the actual mapping of page elements, such as text, images, and sidebars, to grid positions within a document layout remains a manual process. Typically, grid-based document layout is customized for one specific page size, such as an 8½-by-11 inch sheet of paper. There is, however, no obvious way for these customized layouts to adapt to a range of page sizes and other viewing conditions in a graceful manner (i.e., also referred to herein as "document-reflow").

Because grid-based document layout remains a manual process, grid-based design systems generally do not support "document-reflow." Systems that do support the reflowing of document content, such as MICROSOFT WORD and hypertext mark-up language (HTML), typically consider the document content as a single one-dimensional flow that snakes from one page to the next and, therefore, lose the original grid-based document layout.

The difficulty of generalizing grid-based designs explains the generally inferior nature of on-screen layouts compared to similar printed layouts. As screen resolutions of display devices begin to match the resolution quality of a printed page, there arises a need to easily and automatically adapt grid-based document designs to arbitrarily-sized electronic displays. This problem is arguably one of the greatest remaining impediments to creating on-line reading experiences that rival those of ink on paper. On-screen reading experience may eventually surpass the experience of reading paper, because computers provide a multitude of opportunities for customization and style, as well as capabilities such as animation and interactivity.

Adaptive grid-based document layout requires flexible pagination for the mapping of document content to a set of discrete pages. The discrete pages may be subject to various constraints such as the sequential ordering of words in a stream of text, the finite capacity of the pages, and the dependencies between the content within a document (e.g., textual references to figures or tables). Finding a desirable pagination is often difficult when one or more additional types of content, such as figures or tables, are involved.

To acquire optimal pagination, a measure of success must be defined for each of the appropriate sets of discrete pages. Pagination has the "optimal subproblem" property and, therefore, is solvable by dynamic programming. Any optimal solution of n pages would inherently contain an optimal solution of n–1 pages. Typically, a dynamic programming paginator starts with an empty solution set and incrementally adds and solves a subproblem (e.g., a subset of discrete pages) to find an appropriate set of discrete pages. Additionally, the dynamic programming paginator keeps a table of each subproblem's score (e.g., a measure of success based on a predetermined metric) and a pointer back to the preceding subproblem in the optimal solution. A new subproblem is evaluated by scanning the table for the preceding subproblem with the best score that may properly precede the new subproblem. Accordingly, the dynamic programming paginator evaluates each of the possible predecessors of each new subproblem. Unfortunately, there may be a significant number of predecessors of each new subproblem to evaluate, with a vast majority not even qualifying as valid predecessors of the new subproblem. Therefore, the dynamic programming paginator inefficiently conducts evaluations of unusable predecessor subproblems and, thus, slows down the speed of pagination.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Broadly described, the adaptive grid-based document layout system and methods adaptive grid-based document layout system and methods comprise a system and methods for facilitating adaptive grid-based document layout. More particularly, the adaptive grid-based document layout system and methods feature a new approach to adaptive grid-based document layout which encodes a set of adaptive templates that are configurable in a range of different pages sizes and viewing conditions. The templates include various element types and constraint-based relationships that define the layout of elements with reference to viewing conditions under which the document content will be displayed and other content properties. Through a layout engine and paginator, the adaptive grid-based document layout system and methods determine a desirable sequence of templates to use for adapting document content. Additionally, the adaptive grid-based document layout system and methods provide a template authoring tool and user interface for interactively drawing and arranging layout elements within a new adaptive template.

Advantageously, the adaptive grid-based document layout system and methods provide a unique representation of templates and content that enables efficient, optimal pagination, while supporting a large class of grid-based designs. By generalizing the dynamic programming approach, the adaptive grid-based document layout system and methods allow a more expressive document model that provides the paginator flexibility to choose among various page templates, multiple versions of document content, and optional content streams. In modifying and optimizing the dynamic programming approach, the adaptive grid-based document layout system and methods accelerate pagination through a "forward-looking" optimization scheme. Accordingly, document content may be effectively reflowed from one page layout to another page layout without losing a grid-based design. Grid-based designs may automatically be adapted to arbitrarily-sized displays and, thus, bring document publishing one step closer to the decade-old vision of a paperless world.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

FIG. 1 displays a block diagram representation of an adaptive grid-based document layout environment in accordance with an exemplary embodiment of the adaptive grid-based document layout system and methods.

Figure 2:
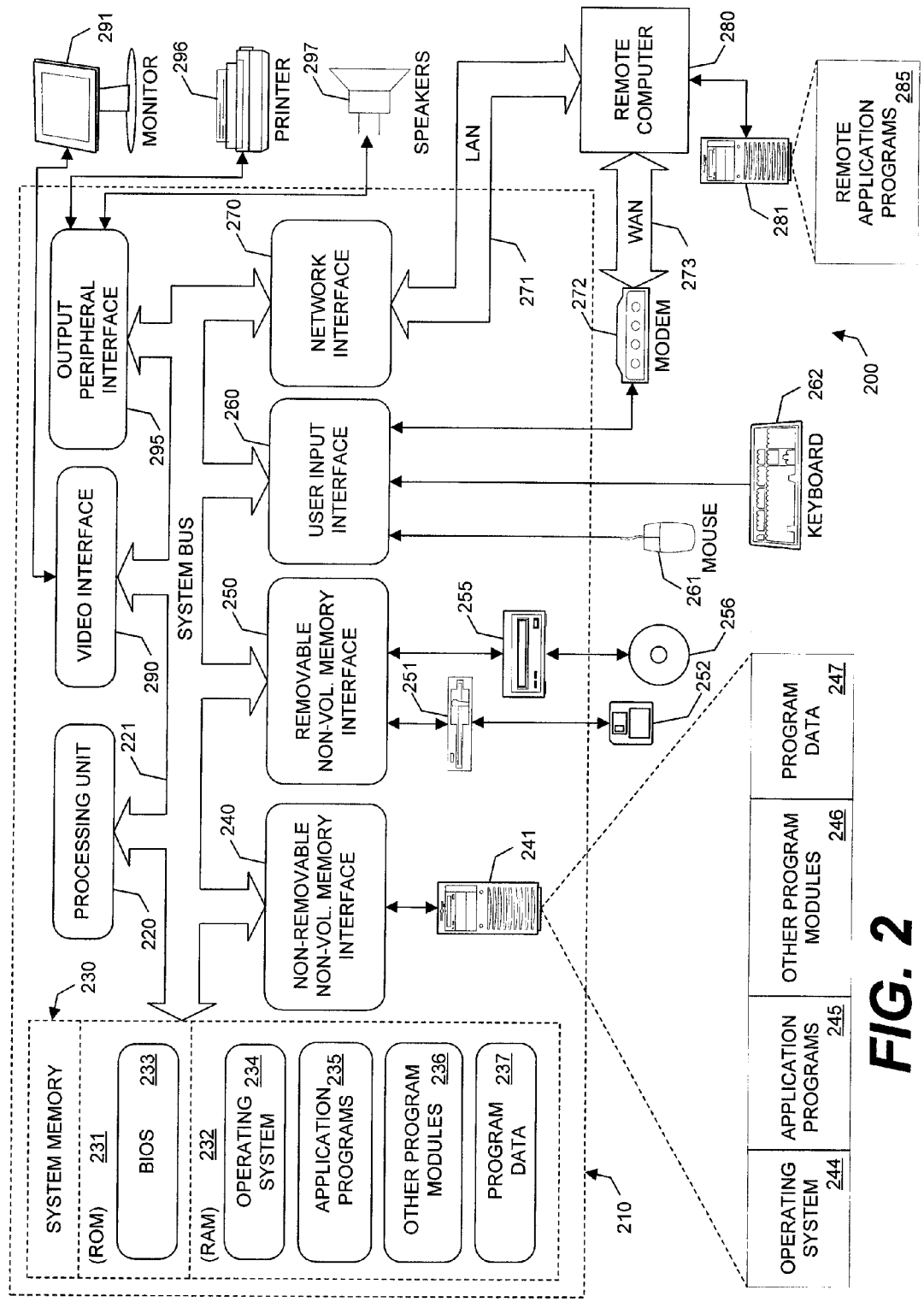

FIG. 2 displays a block diagram representation of a computing environment and computer systems thereof which the adaptive grid-based document layout system and methods may utilize in accordance with an exemplary embodiment thereof.

Figure 3:
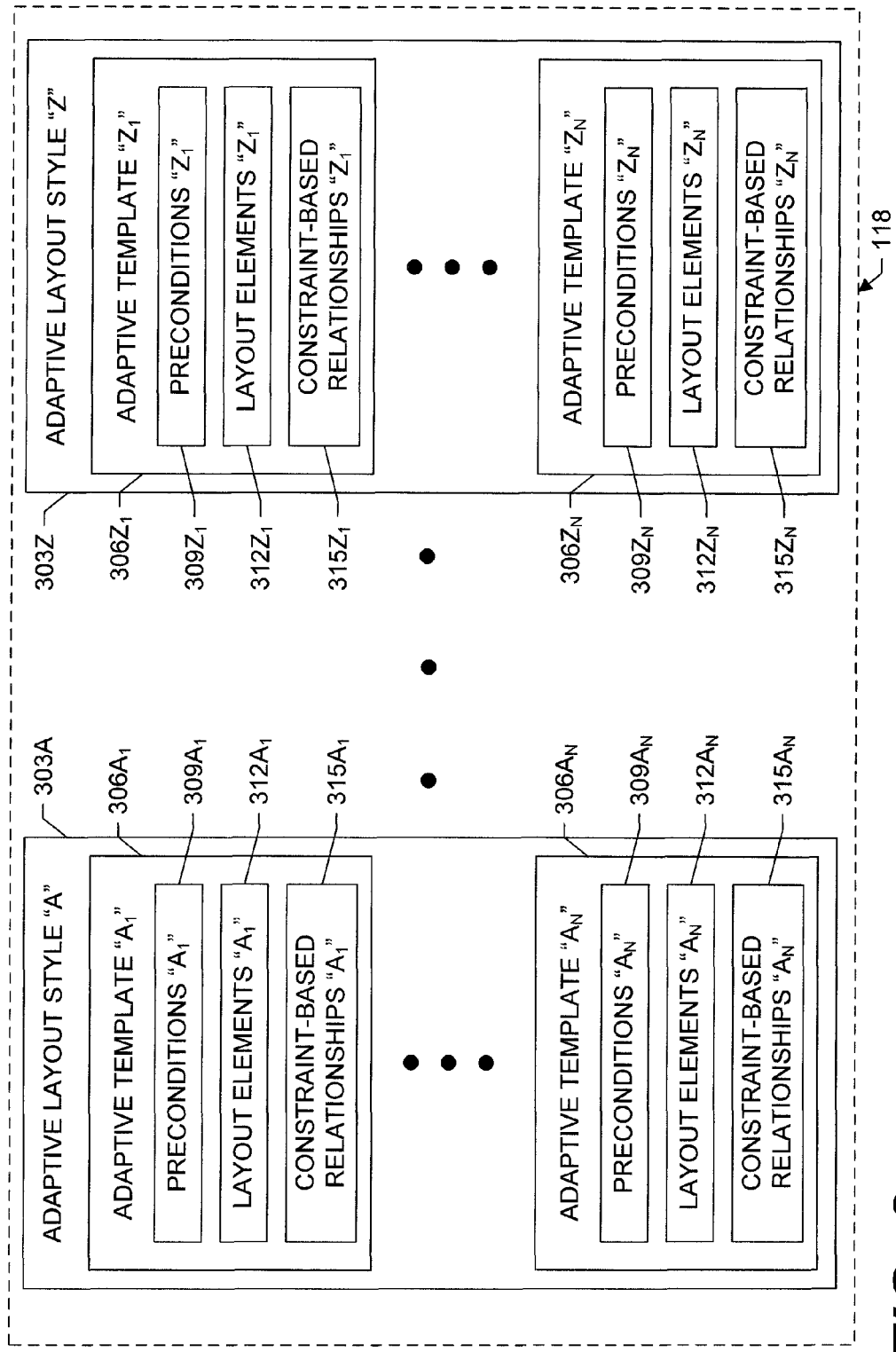

FIG. 3 displays a block diagram representation of a document layout including adaptive layout styles and templates in accordance with an exemplary embodiment of the adaptive grid-based document layout system and methods.

Figure 4:
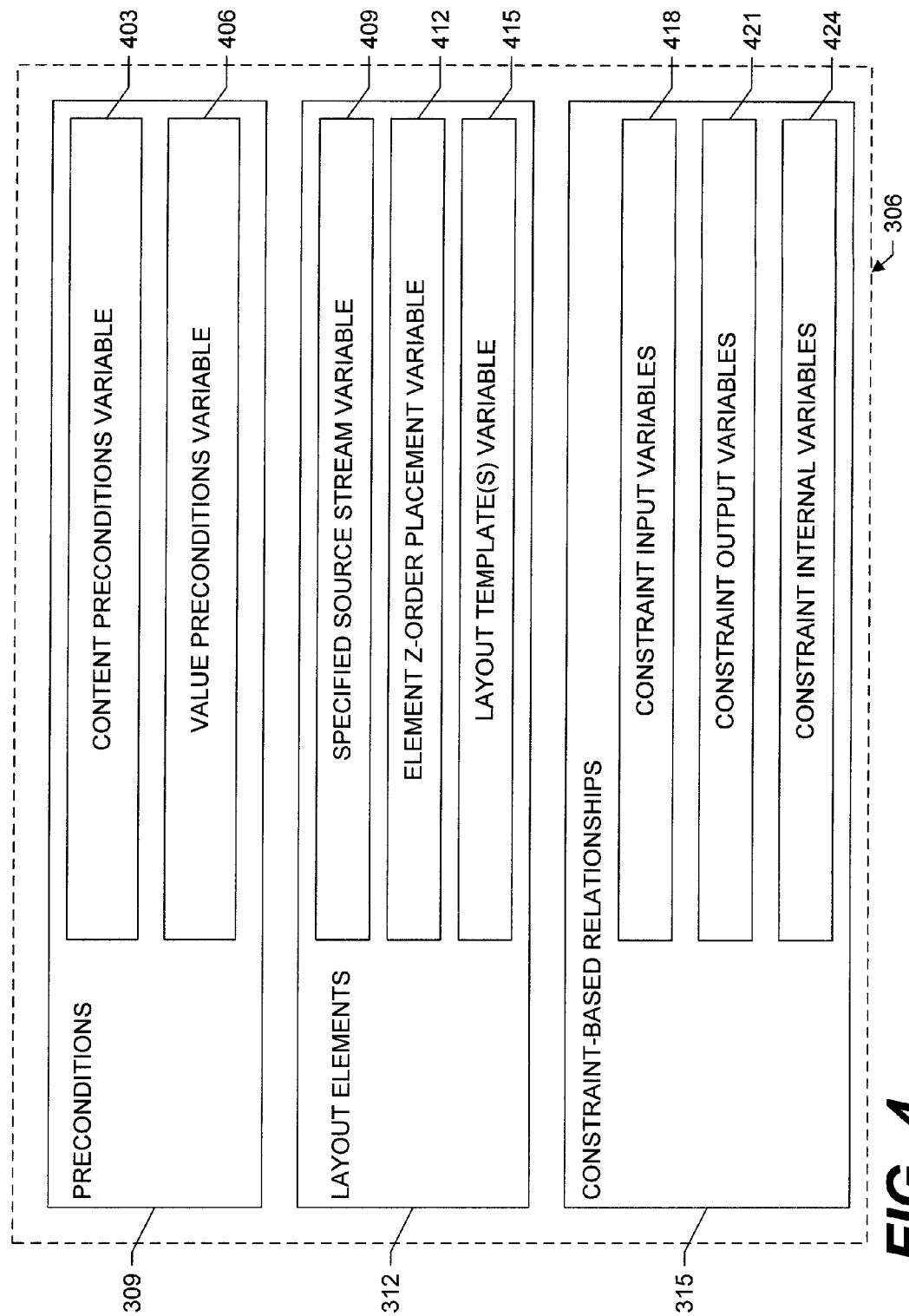

FIG. 4 displays a block diagram representation of an adaptive template in accordance with an exemplary embodiment of the adaptive grid-based document layout system and methods.

Figure 5:
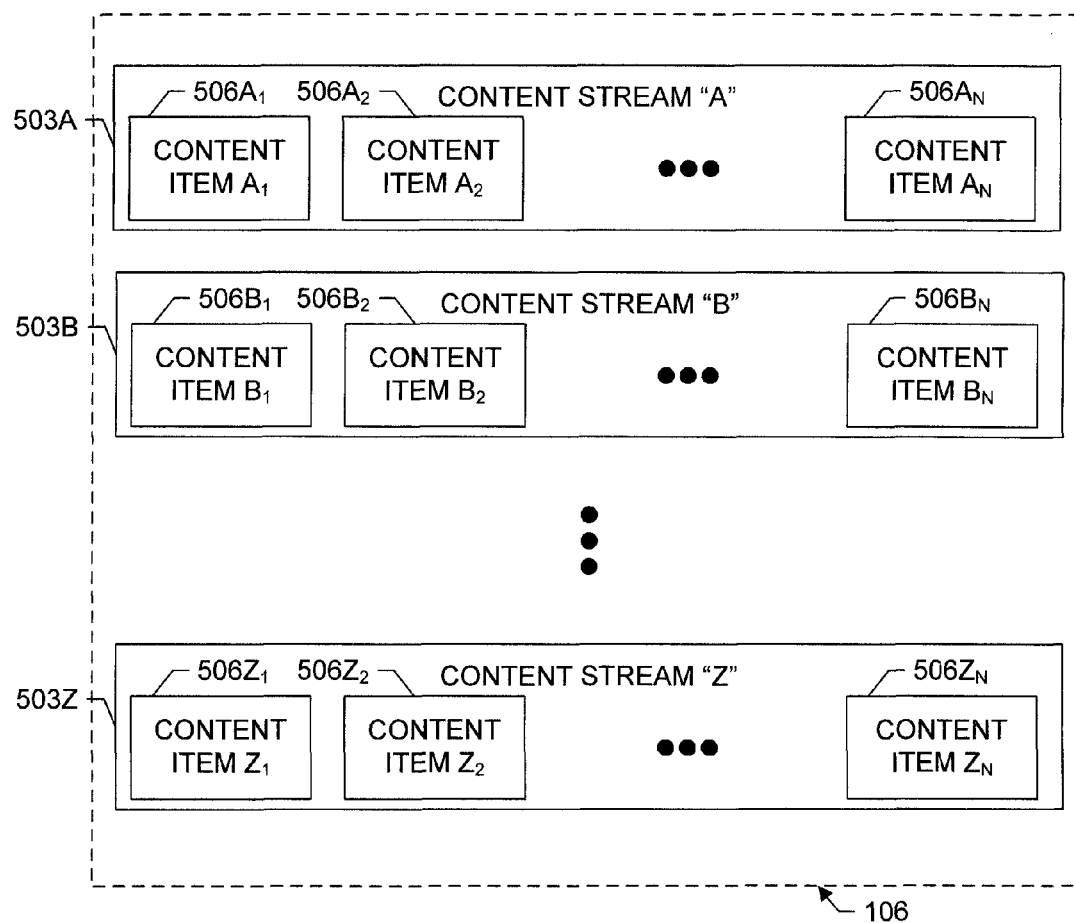

FIG. 5 displays a block diagram representation of a document content including content streams in accordance with an exemplary embodiment of the adaptive grid-based document layout system and methods.

Figure 6:
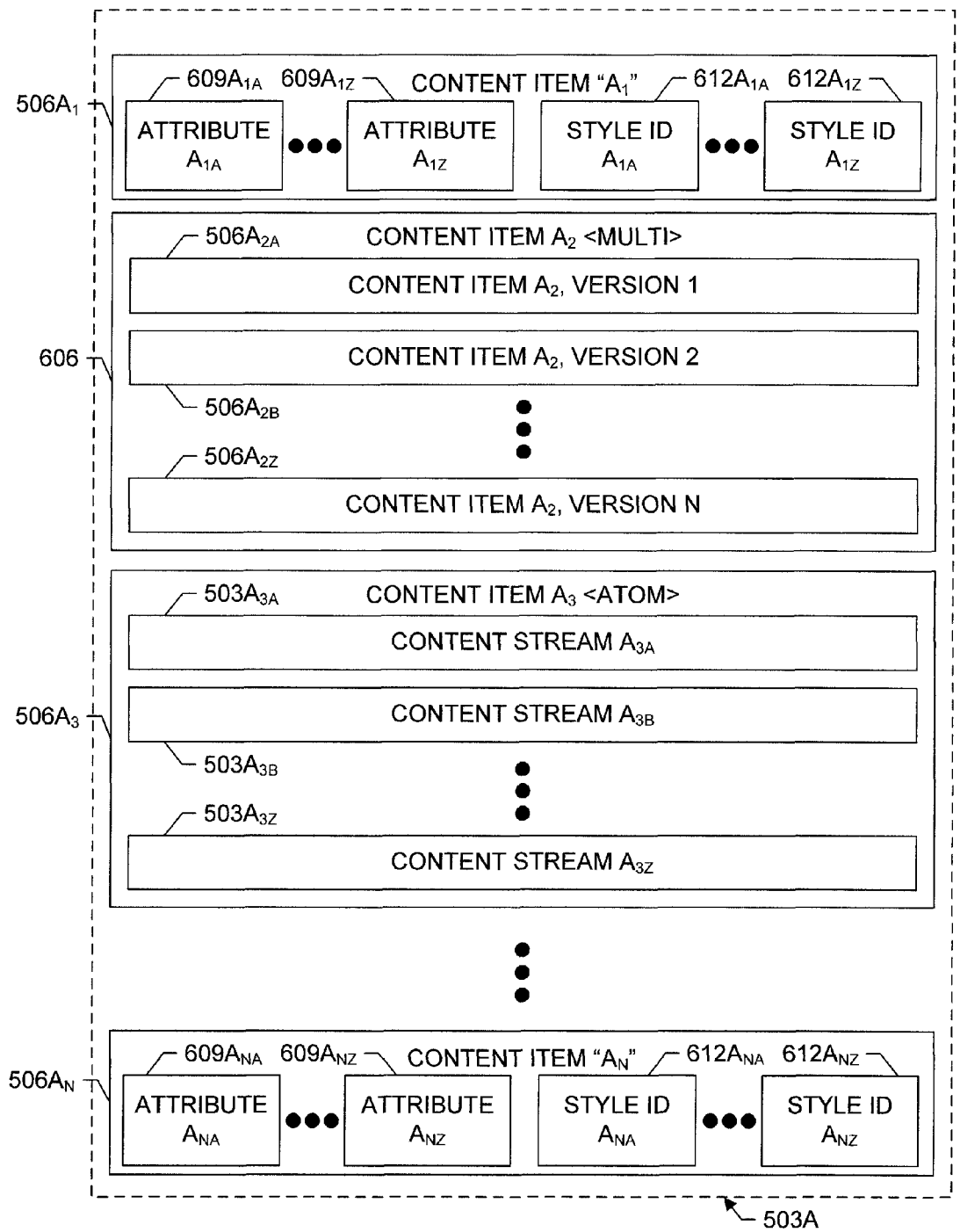

FIG. 6 displays a block diagram representation of a content stream including content items in accordance with an exemplary embodiment of the adaptive grid-based document layout system and methods.

Figure 7A:
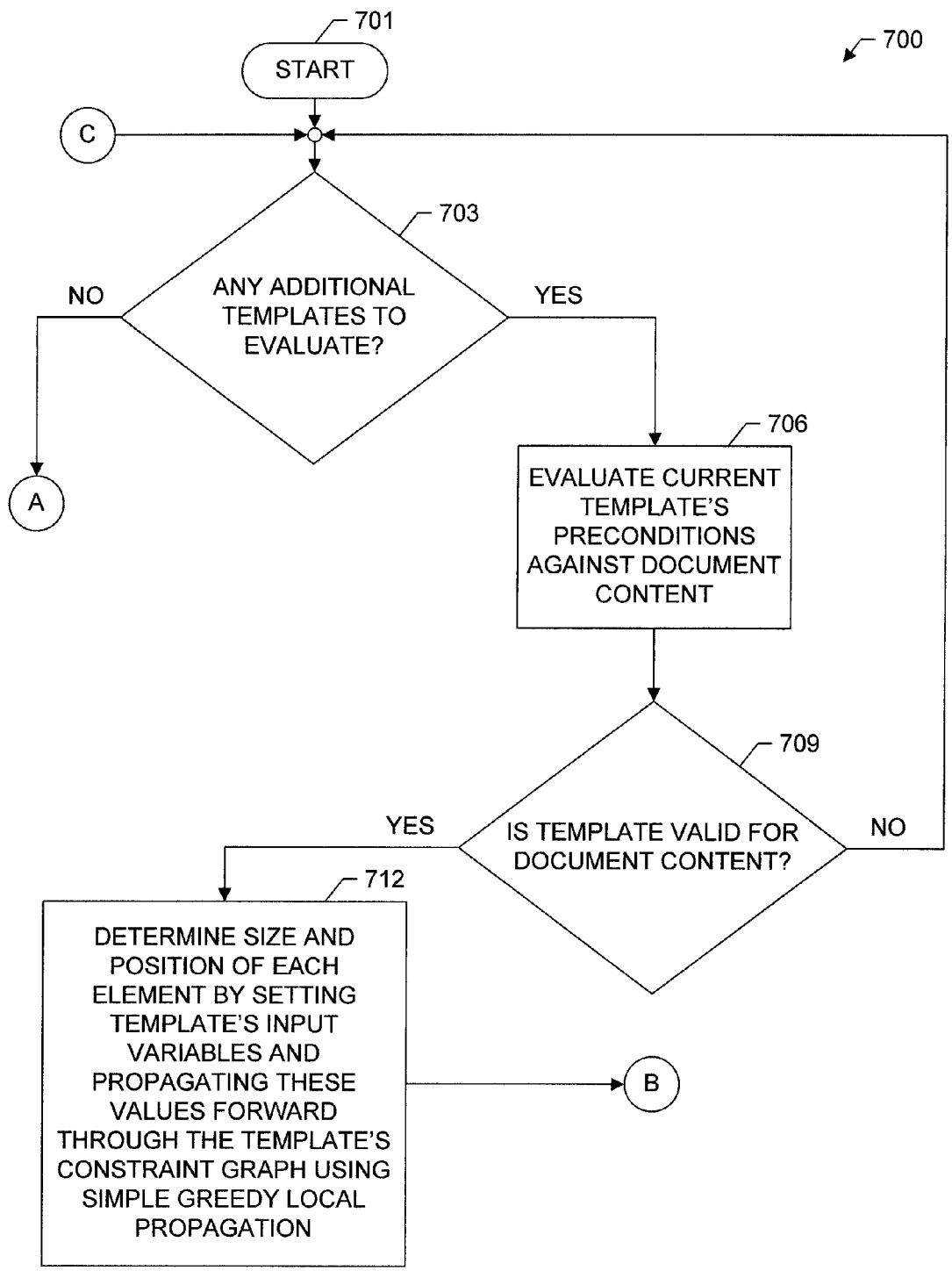
Figure 7B:
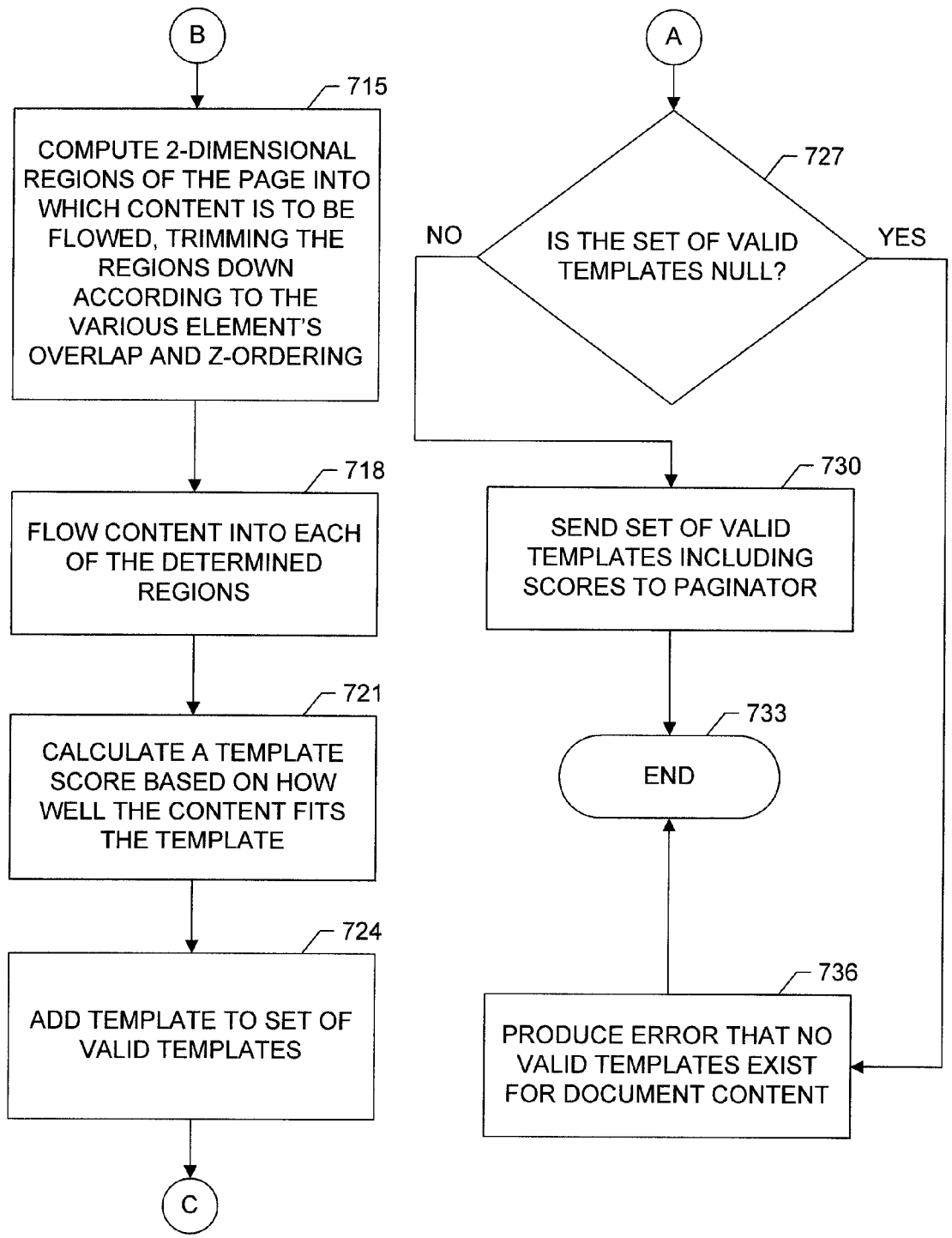

FIGS. 7A-7B display a flowchart representation of a method of applying document content to templates in accordance with an exemplary embodiment of the adaptive grid-based document layout system and methods.

Figure 8A:
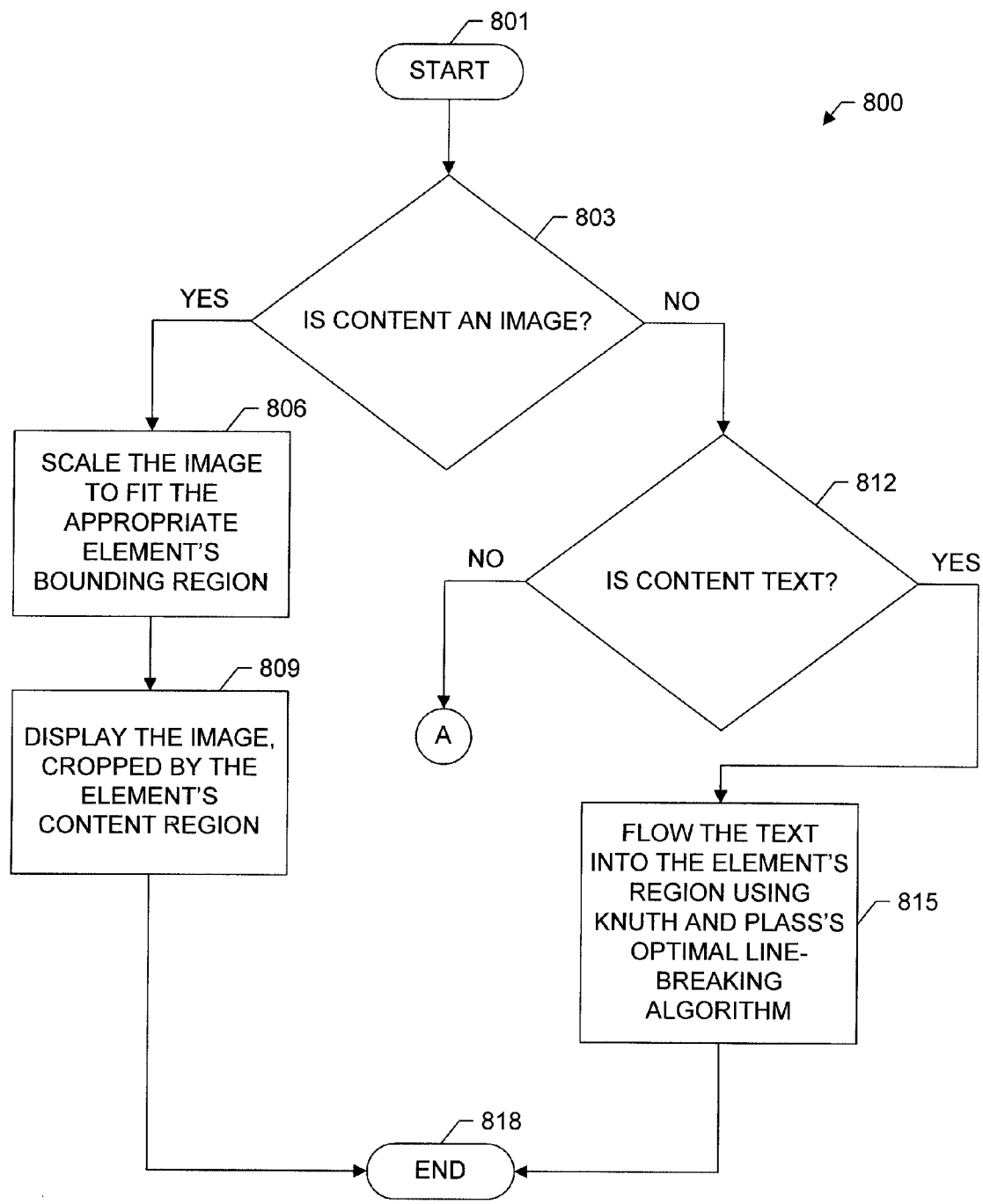
Figure 8B:
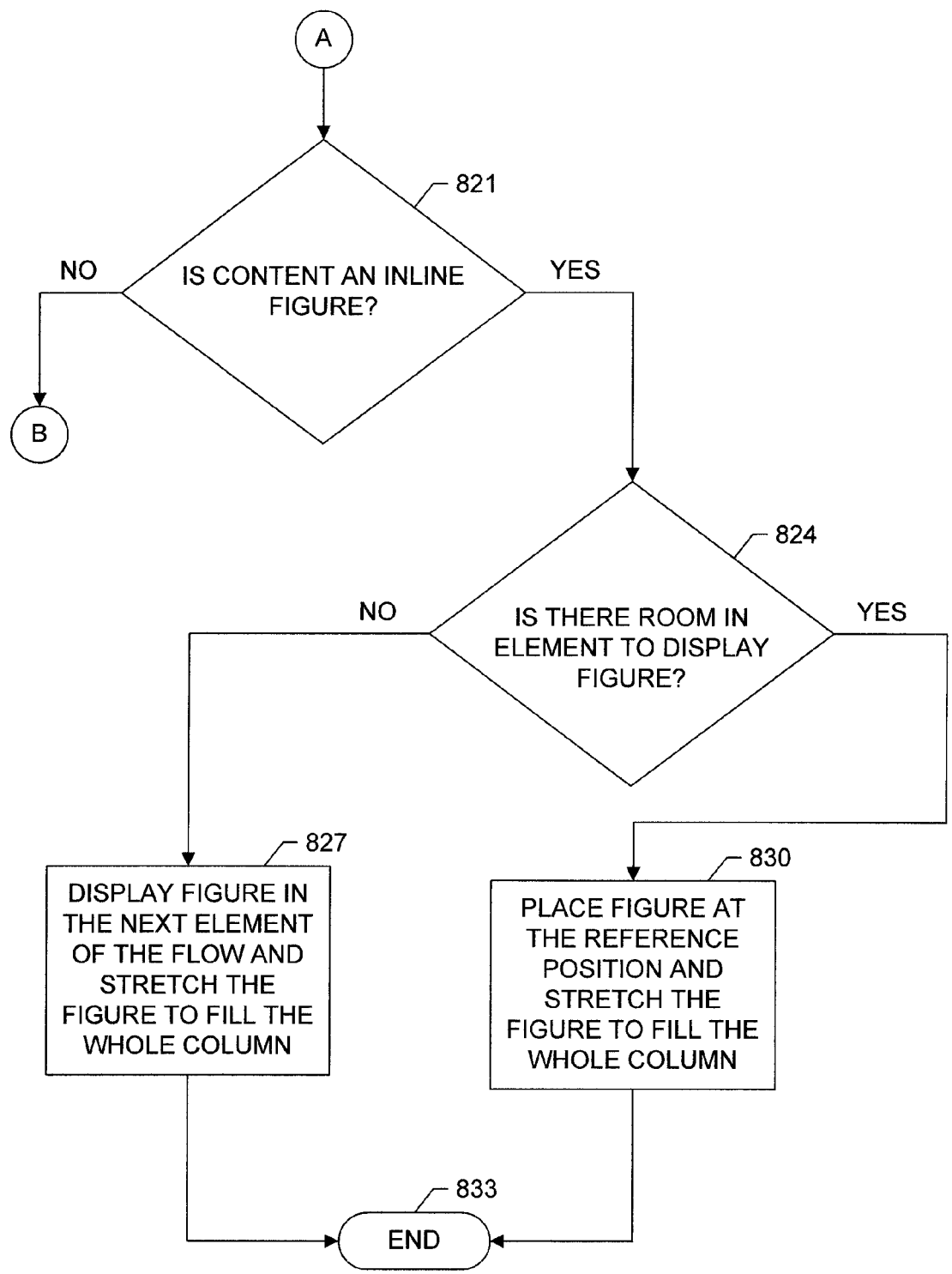
Figure 8C:
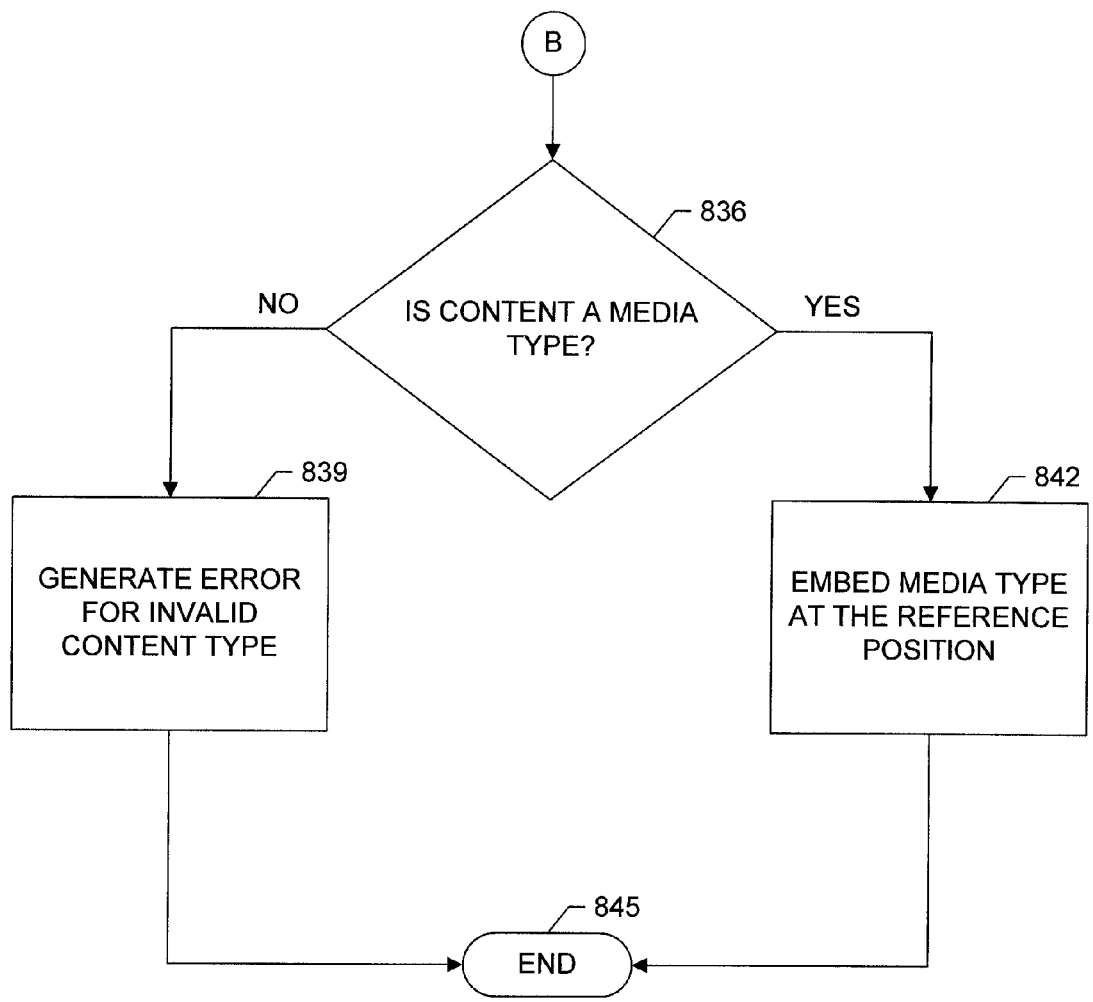

FIGS. 8A-8C display a flowchart representation of a method of flowing content into elements within the document layout in accordance with an exemplary embodiment of the adaptive grid-based document layout system and methods.

Figure 9A:
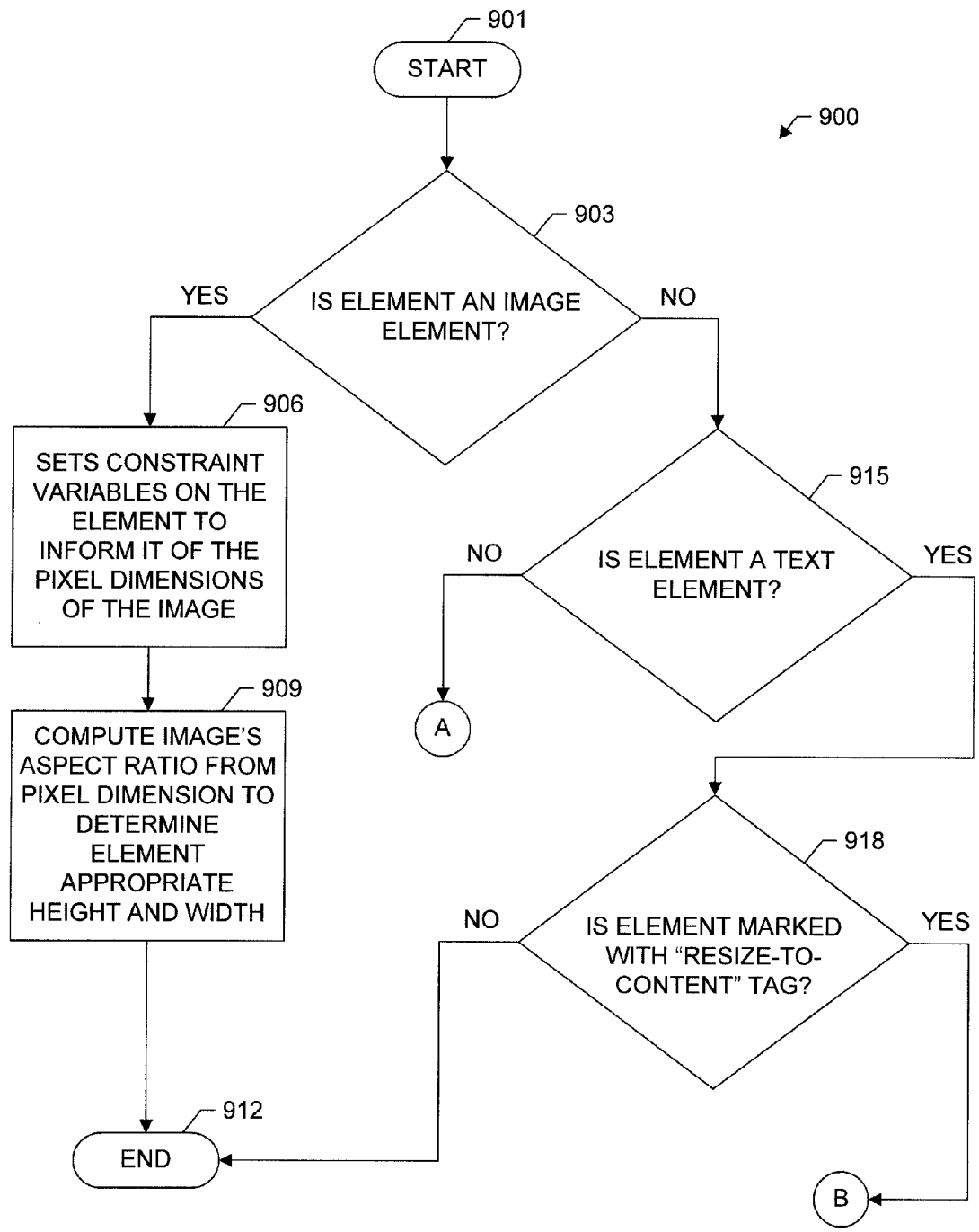
Figure 9B:
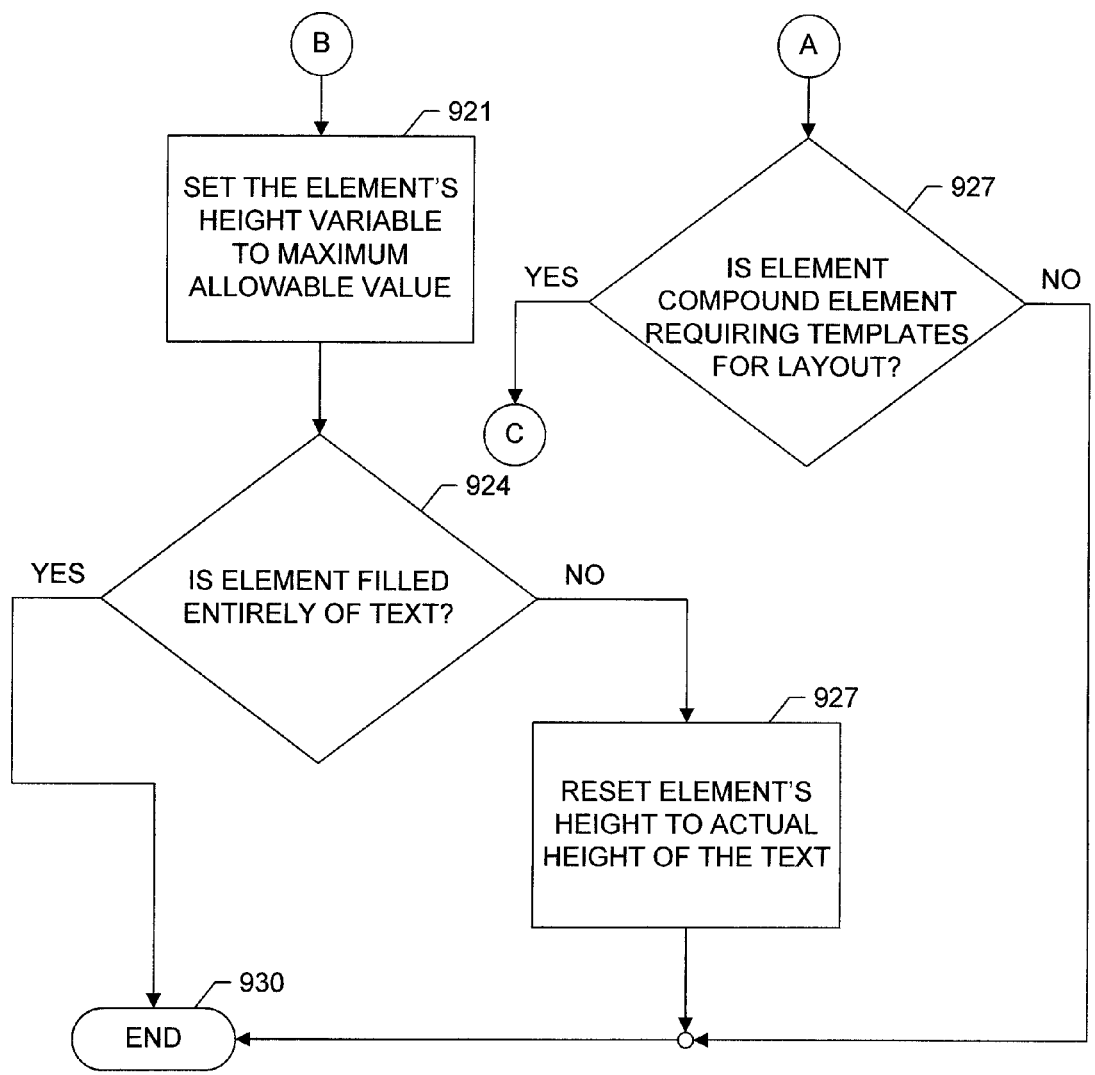
Figure 9C:
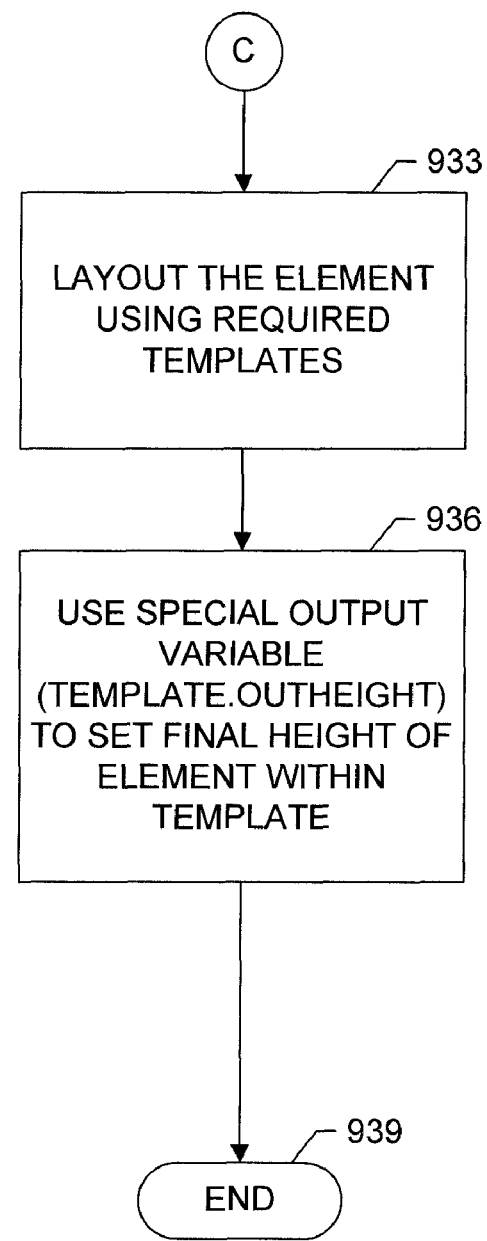

FIGS. 9A-9C display a flowchart representation of a method of self-sizing elements within the document layout in accordance with an exemplary embodiment of the adaptive grid-based document layout system and methods.

Figure 10:
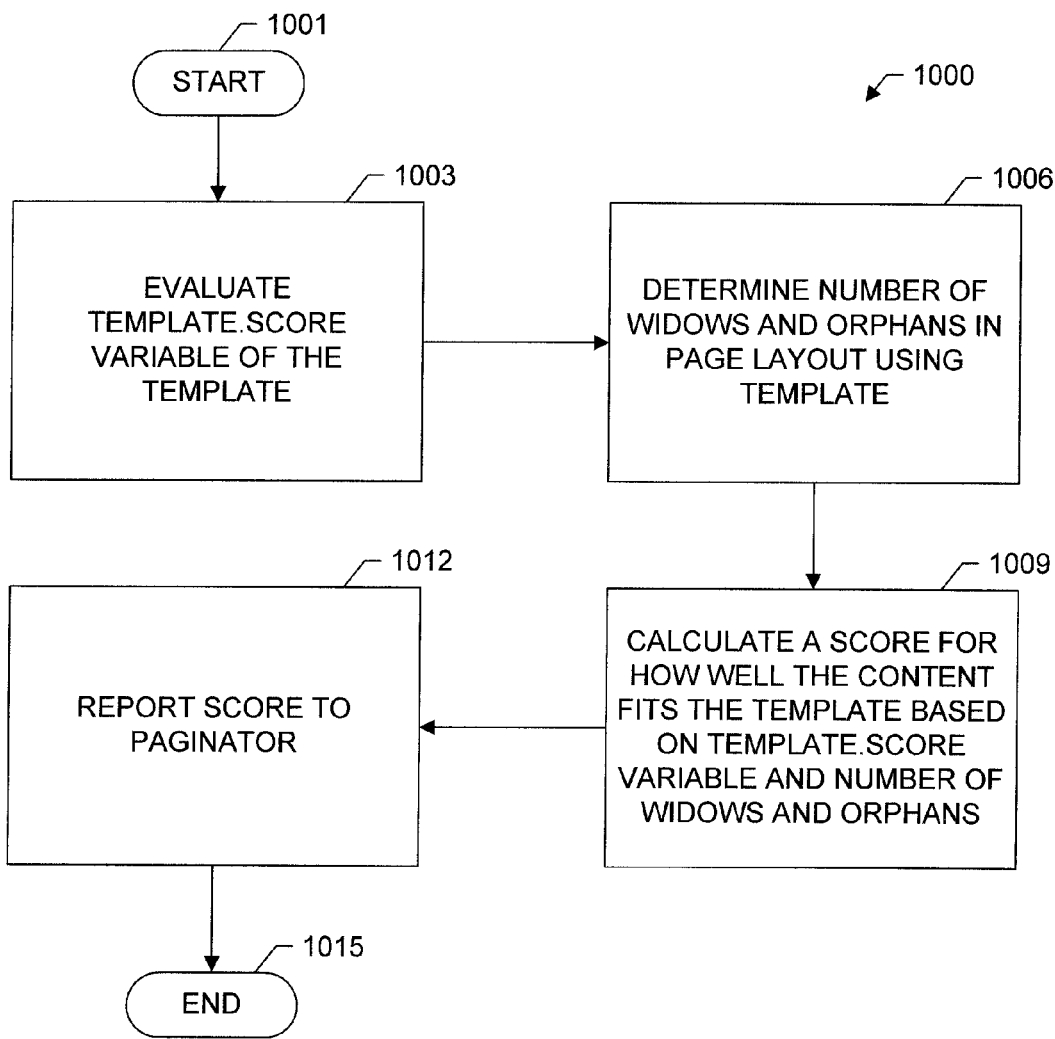
Figure 11A:
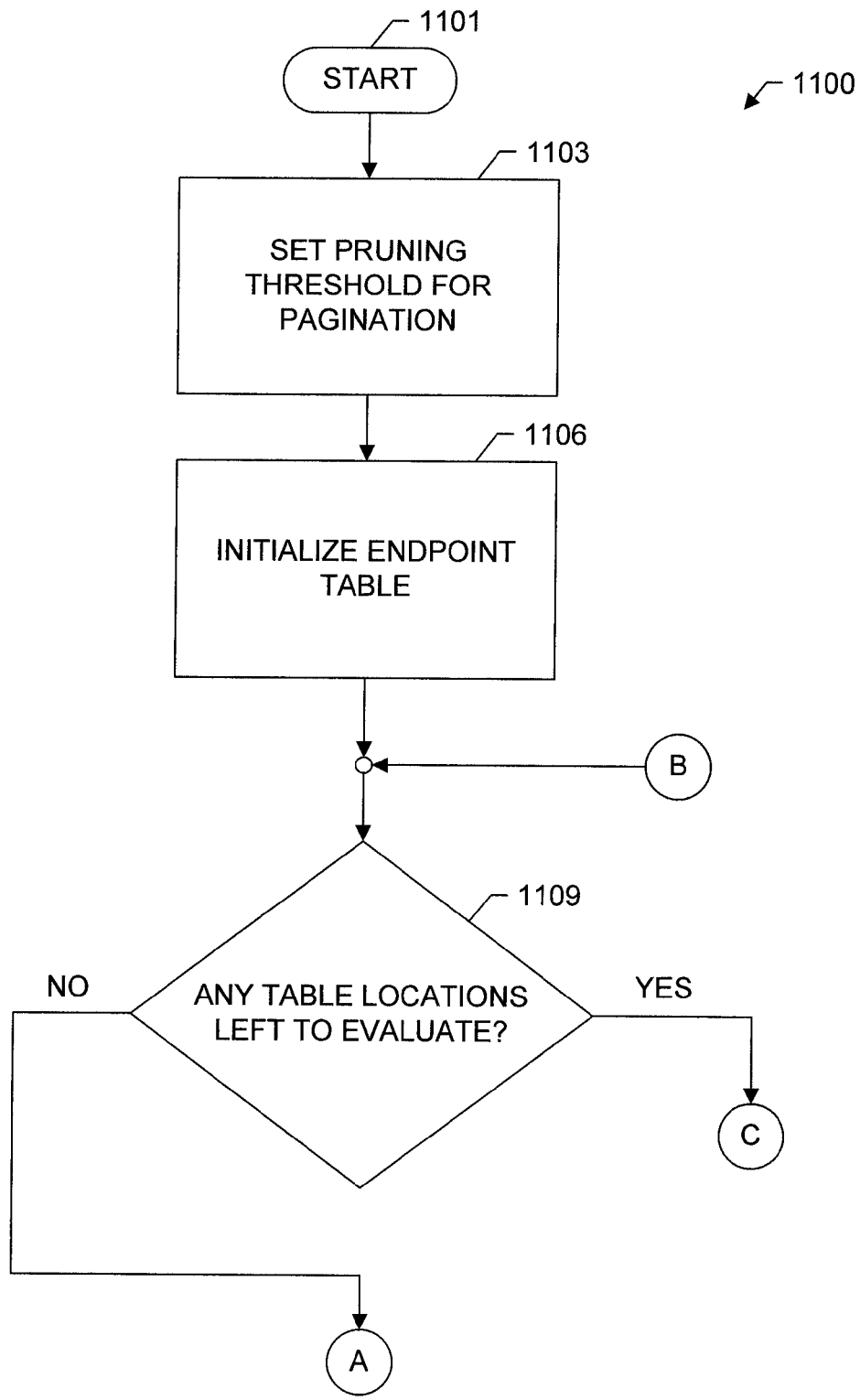
Figure 11B:
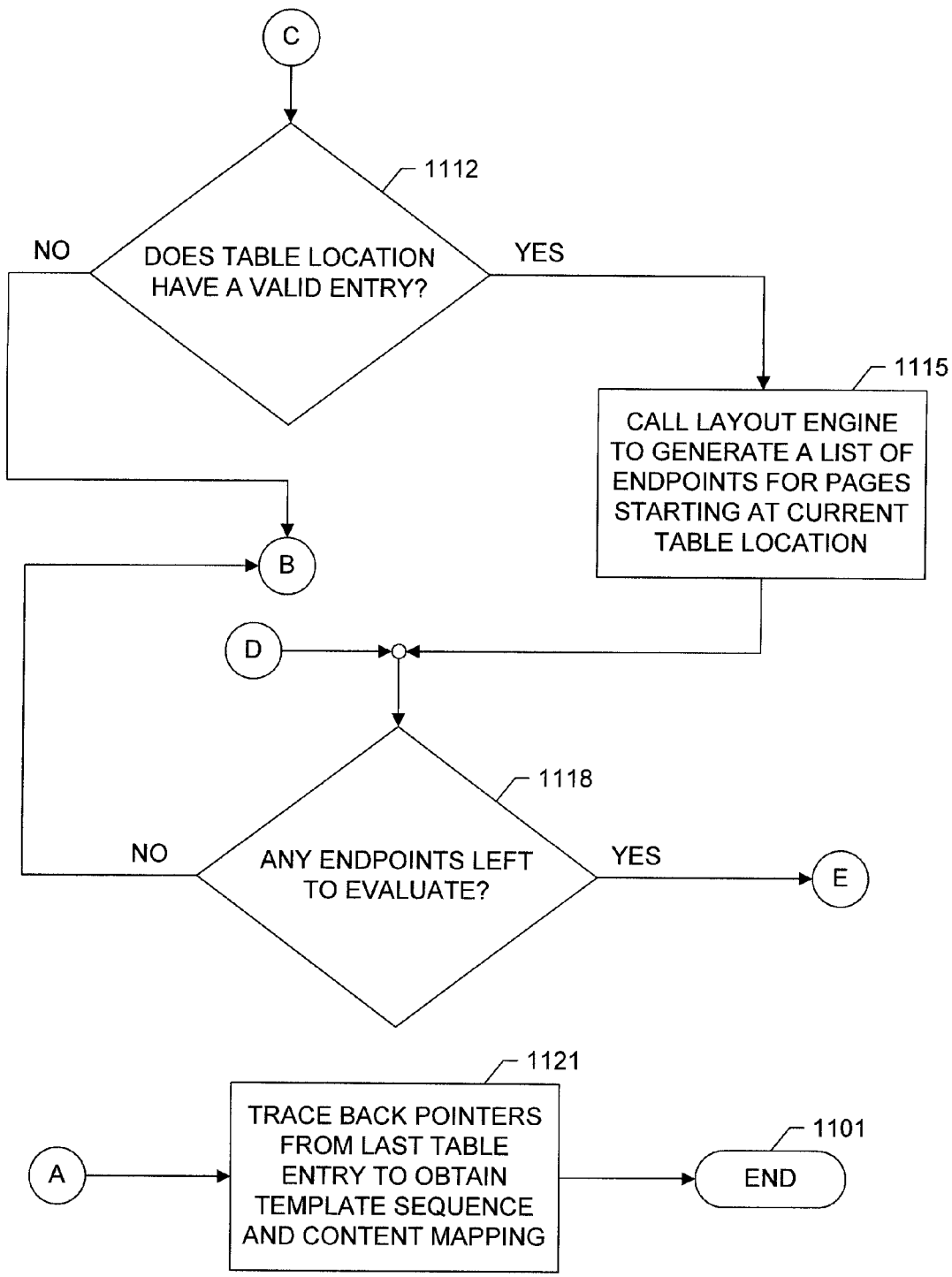
Figure 11C:
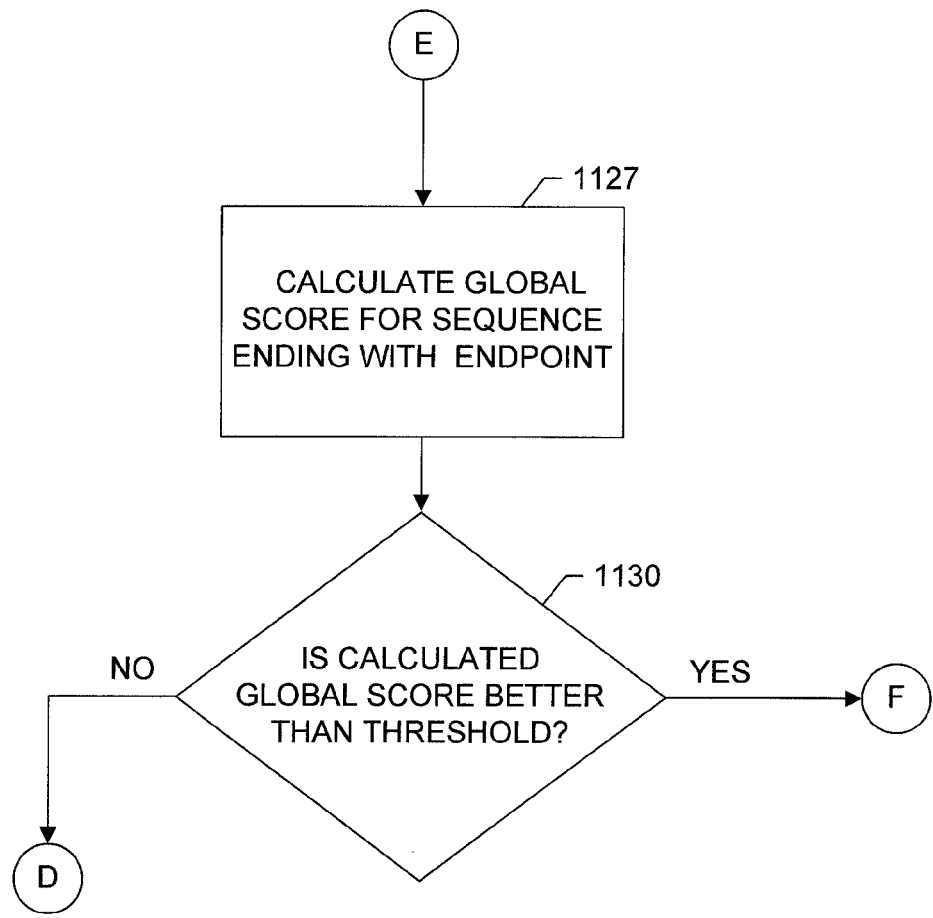
Figure 11D:
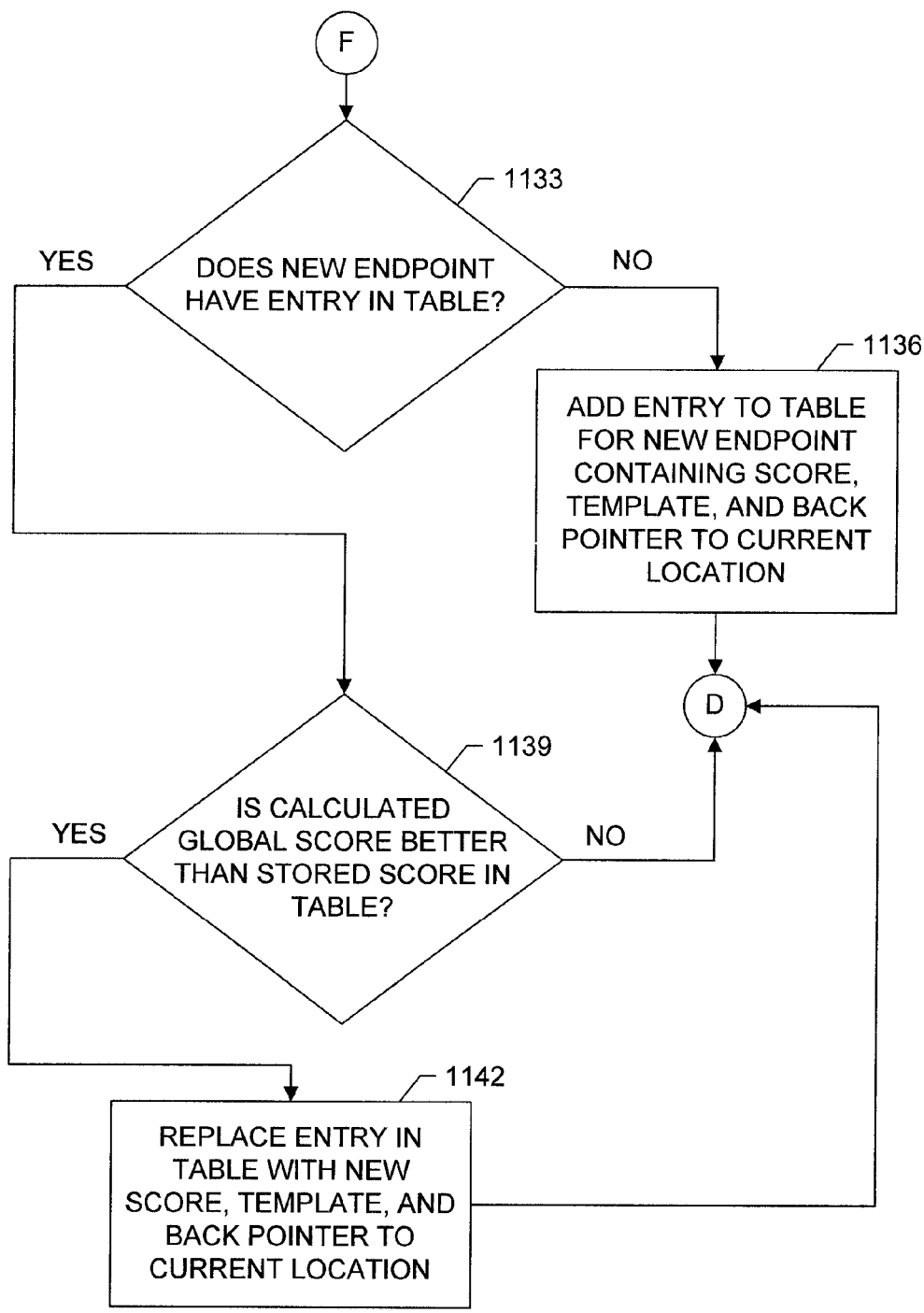

FIG. 10 displays a flowchart representation of a method of scoring a template based on how well the document content fits the template in accordance with an exemplary embodiment of the adaptive grid-based document layout system and methods.

FIGS. 11A-11D display a flowchart representation of a method of optimally paginating document content into an adaptive grid-based document layout in accordance with an exemplary embodiment of the adaptive grid-based document layout system and methods.

DETAILED DESCRIPTION

In the following description of the adaptive grid-based document layout system and methods reference is made to the accompanying drawings, which form a part thereof, and in which is shown by way of illustration a specific example whereby the adaptive grid-based document layout system and methods may be practiced. It is to be understood that other embodiments may be utilized and structural changes may be made without departing from the scope of the claimed subject matter.

Referring now to the drawings, in which like numerals represent like components or steps throughout the several views, FIG. 1 displays a block diagram representation of an adaptive grid-based document layout environment 100 in accordance with an exemplary embodiment of the adaptive grid-based document layout system and methods. The adaptive grid-based document layout environment 100 comprises an adaptive grid-based document system 103, style sheet storage unit 115, and template storage unit 118. The adaptive grid-based document layout environment 100 is supported by hardware and software components similar to those found in well-known computing systems, environments, and/or configurations described more fully below with reference to FIG. 2. The adaptive grid-based document system 103 comprises a paginator 109, layout engine 112, template authoring tool 121, and user interface 124.

The style sheet storage unit 115 communicatively connects to the adaptive grid-based document system 103 via the layout engine 112. The style sheet storage unit 115 stores style sheet data used to specify the styling of text within document content 106. The style sheets storage unit 115 comprises a memory device capable of storing and retrieving data including, but not limited to, random access memory (RAM), flash memory, magnetic memory devices, optical memory devices, hard disk drives, removable volatile or non-volatile memory devices, optical storage mediums, magnetic storage mediums, or RAM memory cards. Alternatively, the style sheets storage unit 115 may comprise a remote storage facility accessible through a wired and/or wireless network system. Additionally, the style sheets storage unit 115 may comprise a memory system including a multi-stage system of primary and secondary memory devices, as described above. The primary memory device and secondary memory device may operate as a cache for each other or the second memory device may serve as a backup to the primary memory device. In yet another arrangement, the style sheets storage unit 115 may comprise a memory device configured as a simple database file or as a searchable, relational database using a query language, such as SQL.

The template storage unit 118 communicatively connects to the adaptive grid-based document system 103 via the paginator 109 and the template authoring tool 121. The template storage unit 118 stores a plurality of templates 306, wherein each template 306 may be used to define the layout of a single page of document content 106. The layout of the document content may include pages laid out according to one or more templates 306. The template storage unit 118 comprises a memory device similar to the memory devices described above with reference to the style sheet storage unit 115.

The paginator 109 communicatively connects to the layout engine 112 and template storage unit 118. The paginator 109 is configured with hardware and software (see FIG. 2) appropriate to perform tasks and provide capabilities and functionality as described herein. Additionally, the paginator 109 may receive document content 106 for processing into an adaptive grid-based layout. The document content 106 may be represented by a variety of content streams 503 that identify various content types such as, but not limited to, body text, images, inline figures, sidebars, captions, media, and other appropriate document content 106. Generally, the paginator 109 determines a mapping of document content 106 onto individual templates 306, which may include, but is not limited to, the globally optimal pairing of document content 106 with templates 306.

The layout engine 112 communicatively connects to the paginator 109 and style sheets storage unit 115. The layout engine 112 is configured with hardware and software (see FIG. 2) appropriate to perform tasks and provide capabilities and functionality as described herein. The layout engine 112 may receive document content 106 and templates 306 from the paginator 109 for processing. Typically, the layout engine 112 formats document content 106 automatically by use of templates 306 (e.g., applies templates 306 to the document content 106) and thereby creates adaptive grid-based documents 127. Additionally, the layout engine 112 may be used to determine a quality score for each part (e.g., each page) of the adaptive grid-based document 127 created from the application of templates 306 to the document content 106.

In operation, the adaptive grid-based document system 103 via the paginator 109 receives document content 106 to be processed and templates 306 from the template storage unit 118. The paginator 109 provides the document content 106 and templates 306 to the layout engine 112 for rendering of actual page layouts. In an alternative embodiment of the adaptive grid-based document layout system and methods, the layout engine 112 is communicatively connected to the template storage unit 118 and, therefore, the layout engine 112 receives templates 306 directly from the template storage unit 118. The layout engine 112 applies style sheets from the style sheets storage unit 115 and templates 306 to the document content 106 and determines a quality score based on the results. The layout engine 112 provides the paginator 109 with all valid template 306 sequences (e.g., all template 306 sequences that successfully and completely adapt the document content 106 to a grid-based document layout) and their corresponding quality scores. The paginator 109 computes either some desirable sequence of templates 306 or the globally optimal sequence of templates 306 based on the quality scores provided by the layout engine 112. After determining a pairing of content with a sequence of templates 306, the paginator 109 provides the document content 109 and the optimal sequence of templates 306 to the layout engine 112. The layout engine 112 automatically formats the document content 106 according to the optimal sequence of templates 306. The resulting adaptive grid-based document 127 is then provided by the adaptive grid-based document system 103 to the appropriate destination (e.g., displayed to the user, provided to another program module, or saved to a file).

The template authoring tool 121 communicatively connects to the template storage unit 118 and a user interface 124. The template authoring tool 121 is configured with hardware and software (see FIG. 2) appropriate to perform tasks and provide capabilities and functionality as described herein. The user interface 124 provides a user with a set of windows, icons, commands, and/or menus for creating or modifying templates 306 within the template storage unit 118. Through use of the template authoring tool 121 and the user interface 124, a user may draw and arrange layout elements, specify how the elements adapt to different page sizes, preview the adaptation interactively, and set template 306 preconditions 309 and constraint-based relationships 315.

In operation, the user interface 124 presents a schematic representation of a template 306 that may be interactively resized. Creating a new layout element 312 within the template 306, generally, requires the user to draw a region on the user interface 124 display and then manipulate the region to a desired size, position, and layer. To maintain the integrity of the adaptive templates 306, most elements 312 of the template 306 require constraint-based relationships 315.

While creating or editing a template, the user may specify page-level constraints by defining a page grid by drawing horizontal or vertical guides and then using a snap-dragging interface to constrain the elements relative to the grid. The horizontal or vertical guides may be designed to either scale relative to the page or maintain a constant offset. Guides may also be dependent on other guides, allowing a user to define a hierarchical grid. Specifically, the user interface 124 supports different types of user operations including, but not limited to: (1) if the user adds a new guide without first selecting any other guides, then the new guide's position is defined relative to the entire page; (2) if the user selects a single existing guide before creating a new guide, then the new guide's position is defined as a constant offset from the selected guide; and (3) if the user selects two existing guides before creating a new guide, then the new guide's position is defined relative to the two selected guides. The user interface 124 may also provide user operations that allow the user to specify constraints directly between elements without the use of guides. For example and not limitation, the user may constrain the bottom of one element to coincide with the top of another element. To address situations where an element's size is determined by the content flowed into that element (and not the geometry of the page alone), the user may utilize the template authoring tool 121 to constrain one of the element's dimensions and then specify that the other dimension be determined from document content 106.

After creating a custom template 306, the user may specify additional preconditions based on the value of any variable in a constraint system. The suitability of a template 306 for document content 106 depends on the use of preconditions and a scoring function. Once a user sets the content sources of an element 312 of the template 306, the content preconditions for a template 306 may be automatically computed. Additionally, a user may add attribute preferences to elements 312 that influence the quality score that the page template 306 receives for a given selection of document content 106. When the user specifies more than one attribute of an element 312, the user may rank the attributes in order of importance via the user interface 124.

The template authoring tool 121 may then automatically construct a scoring function that the layout engine 112 evaluates for different selections of document content 106 that may possibly be flowed into the element. Given the user-specified ranking of attributes in order of importance, the template authoring tool 121 may associate each attribute with a digit in the score, with higher order digits corresponding to more important attributes. When the layout engine 112 evaluates a selection of content, the score may be computed by associating a "1" with all matching attributes, and a "0" with all non-matching attributes. More specifically, if "a1" through "aN" are the N user-specified attribute preferences in order of importance, then the scoring function is constructed by the authoring system as follows: $S=\text{match}(a1,b1)*(10^{(N-1)})+\text{match}(a2,b2)*(10^{(N-2)})\ldots+\text{match}(aN,bN)*(10^{0})$, where S is the quality score of a particular selection of content being evaluated, b1 through bN are the actual attribute values associated with the selection of content, and match(a,b) is a function that returns "1" when "a" equals "b" and "0" otherwise. Thus, this scoring function returns a better or worse score, depending on how well the content matches the attributes specified by the user. The scoring function ensures that more important attributes are given strict priority over less important attributes. For example and not limitation, a selection of content that matches a particular attribute "A" results in a better score than other selections of content that do not match attribute "A" but potentially do match less important attributes.

One skilled in the art will recognize that scoring functions may be implemented in a variety of ways. For example and not limitation, each attribute of an element may be associated with a digit in the final score. The importance of the attribute determines its corresponding digit, with the most important attribute being associated with the most significant digit. Consequently, an attribute that is the k-th most important attribute will correspond with the k-th most significant digit in the final score. For a particular selection of content, the scoring function may associate a "1" with the digits that correspond to matching attributes and a "0" with the digits that correspond to non-matching attributes. The scoring function, therefore, ensures that a piece of content that matches the most important attribute has a higher (i.e., better) score than any other selection of content that does not match the most important attribute.

Different templates 306 within a layout style 303 often include common characteristics (e.g., elements, preconditions, and constraints). Accordingly, the template authoring tool 121 may support a system or model of template 306 inheritance that simplifies the modification of common characteristics across several templates 306 without actually changing each of the templates 306 individually. For example and not limitation, a user may create a new template 306 (e.g., a child template 306) that inherits characteristics of a pre-existing template 306 (e.g., a parent template 306). The child template 306 automatically includes all of the elements, preconditions, and constraints of the parent template 306. Next, the user may add additional elements, preconditions, and constraints to the child template 306 in order to create the desired custom template 306. If the user wants to change one of the properties that is common between the parent and child templates 306, then the user need only modify the properties of the parent template 306, because the modification will propagate via inheritance to all child templates 306 of the parent template 306. The inheritance model simplifies the management of a large number of templates 306 and helps to maintain consistency between the templates 306.

One skilled in the art will recognize that connecting communicatively may include any appropriate type of connection including, but not limited to, analog, digital, wireless and wired communication channels. Such communication channels include, but are not limited to, copper wire, optical fiber, radio frequency, infrared, satellite, or other media.

FIG. 2 displays a block diagram representation of a computing environment 200 and computer systems 210, 280 thereof which the adaptive grid-based document layout system and methods may utilize in accordance with an exemplary embodiment thereof. The computing environment 200 and computer systems 210, 280 thereof represent only one example of a suitable computing environment and computer systems for the practice of the adaptive grid-based document layout system and methods and are not intended to suggest any limitation as to the scope of use or functionality of the invention. Nor should the computer systems 210, 280 be interpreted as having any dependency or requirement relating to any one or combination of components illustrated in the exemplary computing environment 200.

Hence, it should be understood that the adaptive grid-based document layout system and methods is operational with numerous other general purpose or special purpose computing system environments or configurations. Examples of well-known computing systems, environments, and/or configurations that may be appropriate or suitable for use with the adaptive grid-based document layout system and methods include, but are not limited to, personal computers, server computers, hand-held or laptop devices, multiprocessor systems, microprocessor-based systems, set top boxes, programmable consumer electronics, network personal computers, minicomputers, mainframe computers, distributed computing environments that include any of the above systems or devices, and the like.

The adaptive grid-based document layout system and methods may also be described in the general context of comprising computer-executable instructions, such as program modules, being executed by a computer system. Generally, program modules include routines, programs, programming, objects, components, data, data structures, etc. that perform particular tasks or implement particular abstract data types. The adaptive grid-based document layout system and methods may be practiced in distributed computing environments where tasks are performed by remote processing devices that are linked through a communications network. In a distributed computing environment, program modules may be located in both local and remote computer storage media, including, without limitation, in memory storage devices.

With reference to FIG. 2, an exemplary computing environment 200 of the adaptive grid-based document layout system and methods include a general purpose computing device in the form of a computer system 210. Components of computer system 210 may include, but are not limited to, a processing unit 220, a system memory 230, and a system bus 221 that couples various system components including the system memory 230 to the processing unit 220 for bi-directional data and/or instruction communication. The system bus 221 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (i.e., also known as the "Mezzanine bus").

Computer system 210 typically includes a variety of computer-readable media. Computer-readable media may comprise any available media that may be accessed by, read from, or written to by computer system 210 and may include both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data, data structures, program modules, programs, programming, or routines. Computer storage media includes, but is not limited to, RAM, ROM, EEPROM, flash memory or other memory technology, CD-ROM, digital versatile disks (DVD) or other optical disk storage, magnetic cassettes, magnetic tape, magneto-optical storage devices, magnetic disk storage or other magnetic storage devices, or any other medium which may be used to store the desired information and which may be accessed by computer system 210. Communication media typically embodies computer-readable instructions, data, data structures, program modules, programs, programming, or routines in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer-readable media.

The system memory 230 includes computer storage media in the form of volatile and/or nonvolatile memory such as read only memory (ROM) 231 and random access memory (RAM) 232. A basic input/output system 233 (BIOS), containing the basic routines that direct the transfer of information between elements within computer 210, such as during start-up, is typically stored in ROM 231. RAM 232 typically stores data and/or program instructions that are immediately accessible to and/or presently being operated on by processing unit 220. By way of example, and not limitation, FIG. 2 illustrates operating system 234, application programs 235, other program modules 236, and program data 237 which may be resident in RAM 232, in whole or in part, from time-to-time.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that may be included in the exemplary computing environment 200 include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives 241, 251, 255 and their associated computer storage media described above and illustrated in FIG. 2, provide storage of computer-readable instructions, data, data structures, program modules, programs, programming, or routines for computer system 210. In FIG. 2, for example, hard disk drive 241 is illustrated as storing operating system 244, application programs 245, other program modules 246, and program data 247. Note that these components may either be the same as or different from operating system 234, application programs 235, other program modules 236, and program data 237. Operating system 244, application programs 245, other program modules 246, and program data 247 are given different numbers to illustrate that, at a minimum, they are different copies of operating system 234, application programs 235, other program modules 236, and program data 237. A user may enter commands and information into computer system 210 through connected input devices such as a keyboard 262 and pointing device 261, commonly referred to as a mouse, trackball or touch pad. Other connected input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device is also connected to the system bus 221 via an interface, such as a video interface 290. In addition to the monitor 291, computer system 210 may also include other peripheral output devices such as speakers 297 and printer 296, which may be connected through an output peripheral interface 295.

The computer system 210 may operate in a networked environment using bi-directional communication connection links to one or more remote computer systems, such as a remote computer system 280. The remote computer system 280 may be a personal computer, a laptop computer, a server computer, a router, a network PC, a peer device or other common network node, and typically includes many or all of the elements described above relative to the computer system 210, although only a memory storage device 281 of remote computer system 280 has been illustrated in FIG. 2. The bi-directional communication connection links depicted in FIG. 2 include a local area network (LAN) 271 and a wide area network (WAN) 273, but may also include other networks. Such networks are commonplace in offices, enterprise-wide computer networks, intranets and the Internet.

When communicatively connected to a LAN 271, the computer system 210 connects to the LAN 271 through a network interface or adapter 270. When communicatively connected to a WAN 273, the computer system 210 typically includes a modem 272 or other means for establishing a communication link over the WAN 273, such as the Internet. The modem 272, which may be internal or external, may be connected to the system bus 221 via the user input interface 260, or other appropriate mechanism. In a networked environment, program modules depicted relative to the computer system 210, or portions thereof, may be stored in the remote memory storage device 281. By way of example, and not limitation, FIG. 2 illustrates remote application programs 285 as residing in memory storage device 281. It will be appreciated that the network connections shown are exemplary and other means of establishing a bidirectional communication link between the computers may be used.

FIG. 3 displays a block diagram representation of a document layout including adaptive layout styles 303 and templates 306 in accordance with an exemplary embodiment of the adaptive grid-based document layout system and methods. Document content 106 is formatted into a particular document layout by use of templates 306 (e.g., sometimes referred to herein as "adaptive templates 306") stored in the template storage unit 118. Each template 306 is responsible for defining the layout for a single page of content across a range of page dimensions. In the exemplary embodiment of the adaptive grid-based document layout system and methods, the template 306 supports a protocol whereby alternative document content (e.g., a wider version of an image or an optimal drawing) may be automatically chosen if it improves the overall page layout of the document. Also, each template 306 is designed to adapt to a range of display dimensions, as well as to other types of viewing conditions, such as an increase in font size.

Each template 306, additionally, may comprise layout elements 312, constraint-based relationships 315, and preconditions 309. A layout element 312 represents a particular region within the page of the template 306 in which content may be placed. A constraint-based relationship 315 of the template 306 helps to define the relationships between elements 312. A precondition 309 of the template 306 characterizes the suitability of the template 306 for the particular content of a document or the characteristics of a page. The layout elements 312, constraint-based relationships 315, and preconditions 309 are more fully described below with reference to FIG. 4.

In the embodiment of the adaptive grid-based document layout system and methods, document layout is described using a set of templates 306. When the document content 106 is applied to the templates 306, an adaptive grid-based document 127 is produced in an optimal format. For example, the present system may support a wide-range of modern, grid-based layout styles such as designs used for the *New York Times*, the *New Yorker*, the *Washington Post, Newsweek*, or *Time* magazine. Each of the layout styles 303 (e.g., sometimes referred to herein as an "adaptive layout style 303") is defined by a collection of templates 306 that implement the particular characteristics of the particular layout style 303.

As illustrated in FIG. 3, an adaptive layout style 303A is represented by a set of templates $306A_1$, $306A_N$. The ellipsis between adaptive template "$A_1$" $306A_1$ and adaptive template "$A_N$" $306A_N$ illustrates that a plurality of adaptive templates 306 may exist within adaptive layout style "A" 303A and, therefore, the adaptive layout style "A" 303A is not limited to the two adaptive templates $306A_1$, $306A_N$ as shown in FIG. 3. Similarly, the ellipsis between adaptive template "$Z_1$" $306Z_1$ and adaptive template "$Z_N$" $306Z_N$ illustrates that a plurality of adaptive templates 306 may exist within adaptive layout style "Z" 303Z and, therefore is not limited to the two templates $306Z_1$, $306Z_N$ as shown in FIG. 3. Additionally, one adaptive layout style 303A may comprise a different number of adaptive templates 306 than another adaptive layout style 303Z.

The adaptive layout styles 303 are stored in the template storage unit 118. Each adaptive layout 303 identifies a set of templates 306 associated therewith. The ellipsis between adaptive layout style "A" 303A and adaptive layout style "Z" 303Z illustrates that a plurality of adaptive layout styles 303 may exist within the template storage unit 118 and, therefore, is not limited to the two adaptive layout styles 303A, 303Z as shown in FIG. 3. For example and not limitation, adaptive layout styles 303 and adaptive templates 306 may be represented within the adaptive grid-based document layout system and methods by extensible mark-up language (XML).

FIG. 4 displays a block diagram representation of an adaptive template 306 in accordance with an exemplary embodiment of the adaptive grid-based document layout system and methods. Each adaptive template 306 within the template storage unit 118 may comprise layout elements 312, constraint-based relationships 315 for defining relationships between elements 312, and preconditions 309 that characterize the suitability of the template 306 for the particular content of a document.

A layout element 312 represents a particular region within the page of the template 306 in which content may be placed. Typically, the elements 312 within a grid-based document layout are rectangular regions of the template 306 page. Each layout element 312 comprises a specified source stream variable 409, element z-order placement variable 412, and layout templates variable 415. The specified source stream variable 409 specifies which content may be used within the element 312. For example and not limitation, the specified source stream variable 409 may specify that only an image may be placed within the element 312 of the template 306. In an alternative embodiment of the adaptive grid-based document layout system and methods, multiple elements 312 use content from the same content stream 503 (described below with reference to FIG. 5). In such an arrangement, a flow is established and the content of the content stream 503 is distributed from one element $312A_1$ to the next element $312A_2$.

The element z-order placement variable 412 of an element 312 allows each element 312 to specify its place in an element 312 z-order. Generally, elements 312 that are higher in the z-order sit atop lower elements 312 within the document layout and, consequently, the area region of the higher elements 312 is subtracted from the area region of the elements 312 underneath. In effect, the element z-order placement variable 412 enables grid-based page designs to have overlapping elements 312, or regions that appear to cut out other elements' 312 regions. For example, the text in a document layout may flow around a figure. The figure is in a higher z-order than the text and, thus, the figure seems to cut out some of the region reserved for the text. Wrapping text around a figure or image is a technique used within grid-based document layouts.

The layout templates variable 415 allows each element 312 to specify a layout template 306 (or a collection of layout templates 306) that may be used to layout content atoms. A content atom comprises a content item 506 that is made up of multiple content streams 503 (e.g., text, figures, or images). More specifically, a content atom comprises a logical grouping of content which contains one or more elements 312 or content streams 503 of one or more content types, all of which are considered to be a single item in some parent content item 506. For example and not limitation, the element 312 may represent a sidebar which includes text, figures, and images. Through the layout templates variable 415, the template 306 may support fully recursive layout and, thus, may support everything from a figure/caption combination to recursive embedding of content.

The constraint-based relationships 315 (e.g., sometimes referred to herein as "constraints 315") of a template 306 may be used to at least partially define the relationships between elements 312. The size and placement of each element 312 in a template 306 is determined by evaluating a set of interdependent constraint-based relationships 315 that, when considered together, form a directed acyclic graph. The constraint-based relationships 315 comprise constraint input variables 418 and constraint output variables 421 whose values are determined by a mathematical expression in terms of other constraint variables 418, 421. Additionally, the constraint-based relationships 315 comprise constraint internal variables 424 whose values may be used when computing values for the constraint output variables 421. One skilled in the art will recognize that this type of configuration is known as a "one-way constraint system." In the exemplary embodiment of the adaptive grid-based document layout system and methods, however, each template 306 encodes two-dimensional relationships among layout elements 312 as constraints 315 that must be resolved to evaluate a particular layout.

The constraint input variables 418 instruct the template 306 about the context in which the template 306 will be used. For example and not limitation, the constraint input variables 418 may indicate the width and height dimensions of the template 306 or of an element 312 within the template 306. Additionally, the constraint input variable 418 may include custom attributes (e.g., attributes defined by a user through the template authoring tool 121) regarding the document content. In the adaptive grid-based document layout system and methods, a constraint system (not shown) may be represented by a pool of constraints that may be used as constraint input variables 418 and constraint output variables 421. When custom attributes are present within the document content 106, the custom attributes may be added as additional variables within the constraint system. The constraint output variables 421 represent various document output attributes including, but not limited to, the rectangular boundary of each element 312 and the score of the template 306 which allows a template 306 to express its fitness in terms of the content to be inserted within the template 306 (described in more detail below with reference to FIG. 10).

The preconditions 309 of a template 306 at least partially characterize the suitability of the template 306 for the particular content of a document. Each template 306 uses preconditions 309 to express when the template 306 is valid when applied to the document content. For example, a template 306 may be valid if the template 306 may be successfully applied to the document content. One skilled in the art will recognize that different preconditions may be used to determine which templates 306 are valid and which template 306 are invalid. The adaptive grid-based document layout system 103 uses the preconditions 309 during pagination (described in more detail below with reference to FIG. 11). The preconditions 309 may comprise one or more content preconditions variables 403 and/or one or more value preconditions variables 406. A content preconditions variable 403 indicates the amount of content from a given content stream 503 that must be present to adequately fill the template 306 or an element 312 within the template 306. The value preconditions variable 406 indicates the range of values that a given constraint variable 418, 421 must fall between. For example and not limitation, the content preconditions variable 403 and the value preconditions variable 406 may indicate that a particular template 306 is valid if the document content contains exactly two figures available for display and if the page dimensions of the document content fall somewhere between standard letter and A4 page dimensions.

FIG. 5 displays a block diagram representation of a document content 106 including content streams 503 in accordance with an exemplary embodiment of the adaptive grid-based document layout system and methods. Document content 106 is represented within the adaptive grid-based document layout system and methods as a set of individual content streams 503, each of which contains content that is laid out sequentially. Content streams 503 represent different, logically independent parts of the document including, but not limited to, body text, sidebars, figures, pull quotes, and photo credits. Content streams 503 comprise content items 506 which are described more fully below with reference to FIG. 6. As illustrated by the ellipsis, the document content 106 is not limited to the number of content streams 503A, 503B, 503Z shown in FIG. 5. Similarly, the ellipses illustrate that a content stream 503A is not limited to the number of content items $506A_1$, $506A_2$, $506A_N$ shown in FIG. 5.

FIG. 6 displays a block diagram representation of a content stream 503 including content items 506 in accordance with an exemplary embodiment of the adaptive grid-based document layout system and methods. As described above with reference to FIG. 5, content streams 503 comprise content items 506. Content items 506 include, but are not limited to, text, images, audio, video, and other appropriate content types. Each content item 506 is associated with standard markup (e.g., XML) to indicate structure. In addition to the standard markup, each content item 506 may be annotated with custom attributes 609 that alter the way the content item 506 is treated by the layout engine 112 and templates 306. For example and not limitation, a content item 506 representing an image may have an attribute 609 that signifies the image's importance within the document layout. Accordingly, the layout engine 112 utilizing the content item 506 within a template 306 may check the attribute 609 value to determine how large to make the image in the final layout. The ellipsis between attribute "$A_{1A}$" $609A_{1A}$ and attribute "$A_{1Z}$" $609A_{1Z}$ illustrates that a plurality of attributes 609 may exist within the content item "$A_1$" $506A_1$ and, therefore, the content item "$A_1$" $506A_1$ is not limited to the two attributes $609A_{1A}$, $609A_{1Z}$ as shown in FIG. 6. Similarly, the ellipsis between attribute "$A_{NA}$" $609A_{NA}$ and attribute "$A_{NZ}$" $609A_{NZ}$ illustrates that a plurality of attributes 609 may exist within the content item "$A_N$" $506A_N$ and, therefore, the content stream "$A_N$" $506A_N$ is not limited to the two attributes $609A_{NA}$, $609A_{NZ}$ as shown in FIG. 6.

In the exemplary embodiment of the adaptive grid-based document layout system and methods, text content items $506A_1$ may include style identifiers $612A_{1A}$, $612A_{1Z}$ to specify the styling of the text within the document content 106. Style identifiers 612 are typically represented by a stylesheet language such as, but not limited to, cascading style sheets (CSS) or extensible style language (XSL). One skilled in the art will recognize that a stylesheet language enables a user to define how different text elements will appear within a document (e.g., font, font style, and font size). Accordingly, the style identifiers 612 may be associated with formatting rules in a separate stylesheet file, which is stored in the style sheets storage unit 115. The ellipsis between style identifier "$A_{1A}$" $612A_{1A}$ and style identifier "$A_{1Z}$" $612A_{1Z}$ illustrates that a plurality of style identifier s 612 may exist within the content item "$A_1$" $506A_1$ and, therefore, the content item "$A_1$" $506A_1$ is not limited to the two style identifier s $612A_{1A}$, $612A_{1Z}$ as shown in FIG. 6. Similarly, the ellipsis between style identifier "$A_{NA}$" $612A_{NA}$ and style identifier "$A_{NZ}$" $612A_{NZ}$ illustrates that a plurality of style identifier s 612 may exist within the content item "$A_N$" $506A_N$ and, therefore, the content item "$A_N$" $506A_N$ is not limited to the two style identifier s $612A_{NA}$, $612A_{NZ}$ shown in FIG. 6.

Content items 506 may also be encoded to include multiple versions $506A_{2A}$, $506A_{2B}$, $506A_{2Z}$ of any piece of content. Each of the different content item versions $506A_{2A}$, $506A_{2B}$, $506A_{2Z}$ are packaged inside a <multi> tag 606. During document layout, the adaptive grid-based document layout system 103 chooses one of the versions to use when formatting the page with a template 306. To assist the adaptive grid-based document layout system 103, each of the different content item versions $506A_{2A}$, $506A_{2B}$, $506A_{2Z}$ may comprise attributes 609 that suggest the most appropriate use of each particular content item version $506A_{2A}$, $506A_{2B}$, $506A_{2Z}$. For example and not limitation, a first version of content item "$A_2$" $506A_{2A}$ may indicate that the first version of the content item $506A_{2A}$ is best used in a "summary" section, while a second version of content item "$A_2$" $506A_{2B}$ may indicate that the second version of the content item $506A_{2B}$ is best used in a sidebar. A template 306 may choose the appropriate content item version $506A_{2A}$, $506A_{2B}$, $506A_{2Z}$ based on how the template 306 intends to format the document content. If no attributes 609 exist to define the different versions of a content item 506, then the adaptive grid-based document layout system 103 is free to choose the version that works best for the format of the current page or document. The ellipsis between the second version of content item "$A_2$" $506A_{2B}$ and the nth version of content item "$A_2$" $506A_{2Z}$ illustrates that a plurality of content item 506 versions may exist within the <multi> tag 606 and, therefore, the <multi> tag 606 is not limited to the three content item versions $506A_{2A}$, $506A_{2B}$, $506A_{2Z}$ as shown in FIG. 6.

Content streams $503A_{3A}$, $503A_{3B}$, $503A_{3Z}$ may also be nested hierarchically within a parent content item $506A_3$ using an <atom> tag which groups a collection of content streams $503A_{3A}$, $503A_{3B}$, $503A_{3Z}$ together as a content atom within a parent content item $506A_3$. The collection of content streams $503A_{3A}$, $503A_{3B}$, $503A_{3Z}$ is then treated as a single content item $506A_3$. Document elements such as a sidebar are inherently represented by multiple document elements (e.g., text, figures, caption, and footer). The <atom> tag permits multiple content streams 503 to be treated as one single item of content for document layout purposes. For example and not limitation, an <atom> tag may group a "title" content stream 503, "figure" content stream 503, "figure caption" content stream 503, "descriptive text" content stream 503, and "footer" content stream 503 within a parent "sidebar" content item 506. The ellipsis between content stream $503A_{3B}$ and content stream $503A_{3Z}$ illustrates that a plurality of content streams 503 may exist within a parent content item $506A_3$ and, therefore, the parent content item $506A_3$ is not limited to the three content streams $503A_{3A}$, $503A_{3B}$, $503A_{3Z}$ as shown in FIG. 6.

FIGS. 7A-7B display a flowchart representation of a method 700 of applying document content 106 to templates 306 in accordance with an exemplary embodiment of the adaptive grid-based document layout system and methods. The layout engine 112 combines the document content 106 received from the paginator 109 with the templates 306 from the template storage unit 118 and the style sheets from the style sheets storage unit 115. The result is a collection of potential page layouts that define the document's layout style.

After starting at step 701, the layout engine 112 proceeds to step 703 where the layout engine 112 determines whether additional templates 306 need to be evaluated using the document content 106. Initially, none of the templates 306 within the template storage unit 118 will have been evaluated. As step 703 is repeated, however, the layout engine 112 will consider other templates 306 available within the template storage unit 118 until all of the templates 306 have been considered. Alternatively, the layout engine 112 evaluates all of the templates 306 within a data structure (e.g., an array or vector) provided by the paginator 109 prior to step 703 (not shown), instead of all of the templates 306 within the template storage unit 118. If at step 703, the layout engine 112 determines that no additional templates 306 need to be evaluated, then the layout engine 112 proceeds to step 727, described below. If, however, at step 703, the layout engine 112 determines that an additional template 306 needs to be evaluated, then the layout engine proceeds to step 706 where the preconditions 309 of the template 306 currently being considered (e.g., also referred to herein as "current template 306") are evaluated against the document content 106. Next, at step 709, the layout engine 112 determines whether the current template 306 is valid for the document content 106 being considered.

If at step 709, the layout engine 112 determines that the current template 306 is not valid for the document content 106 being considered, then the layout engine 112 proceeds to step 703, described above. If, however, at step 709, the layout engine 112 determines that the current template 306 is valid for the document content 106 being considered, then the layout engine 112 proceeds to step 712 where the layout engine 112 determines the size and position of each element 312 of the template 306 by setting the current template's input variables 418 and propagating these values forward through the current template's constraint graph using simple greedy local propagation.

Then, at step 715, the layout engine 112 computes the two-dimensional regions of the layout page to be generated by the template 306 and into which the document content 106 will be flowed. Additionally, the layout engine 112 trims down the regions according to any overlap between elements 312 or based on element z-order placement variables 412.

Next, at step 718, the layout engine 112 flows document content 106 into each of the determined regions. The layout engine 112 then proceeds to step 721 where the layout engine 112 calculates a template score for the template 306 based on how well the document content 106 fits the template 306 (described in more detail below with reference to FIG. 10). Next, at step 724, the layout engine 112 adds the template 306 to a set or sequence of valid templates 306. The layout engine 112 then proceeds to step 703, described above.

As described above, if the layout engine 112 at step 703 determines that no additional templates 306 need to be evaluated, then the layout engine 112 proceeds to step 727 where the layout engine 112 determines if the set of valid templates 306 is empty. If, at step 727, the layout engine 112 determines that the set of valid templates 306 is empty, then the layout engine 112 proceeds to step 736 where the layout engine 112 produces an error that no valid set of templates 306 exists for the document content 106. The layout engine 112 then terminates operation in accordance with method 700 at step 733. If, however, at step 727 the layout engine 112 determines that a set of valid templates 306 exists, then the layout engine 112 proceeds to step 730 where the layout engine 112 sends the set of valid templates 306 and corresponding scores to the paginator 109. The layout engine 112 then terminates operation in accordance with method 700 at step 733.

FIGS. 8A-8C display a flowchart representation of a method 800 of flowing content into elements 312 within the document layout in accordance with an exemplary embodiment of the adaptive grid-based document layout system and methods. The layout engine 112 controls the flow of content into element regions according to content type. Generally, content type includes, but is not limited to, images, text, inline figures, and media.

After starting at step 801, the layout engine 112 proceeds to step 803 where the layout engine 112 determines whether the content type is an image. If, at step 803, the layout engine 112 determines that the content type is an image, then the layout engine 112 proceeds to step 806 where the layout engine 112 scales the image to fit the bounding region of the appropriate element 312. Next, at step 809, the layout engine 112 displays the image that has been cropped by the content region of the element 312. The layout engine 112 then terminates operation in accordance with method 800 at step 818.

If, however, at step 803 the layout engine 112 determines that the content type is not an image, the layout engine 112 proceeds to step 812 where the layout engine 112 determines whether the content type is text. If, at step 812, the layout engine 112 determines that the content type is text, then the layout engine 112 proceeds to step 815 where the layout engine 112 permits the text to flow into the bounding region of the element 312 using a line-breaking algorithm such as, but not limited to, Knuth and Plass's optimal line-breaking algorithm. The layout engine 112 then terminates operation in accordance with method 800 at step 818.

If, however, at step 812 the layout engine 112 determines that the content type is not text, then the layout engine 112 proceeds to step 821 where the layout engine 112 determines whether the content type is an inline figure (e.g., figures that occur within the flow of text). If, at step 821, the layout engine 112 determines that the content type is an inline figure, the layout engine 112 proceeds to step 824 where the layout engine 112 determines whether there is room in the bounding region of the element 312 to display the figure. If, at step 824, the layout engine 112 determines that there is room in the bounding region of the element 312 to display the figure, then the layout engine 112 proceeds to step 830 where the layout engine 112 places the figure at the specified reference position and resizes the figure to fill the whole column of the element 312. The layout engine 112 then terminates operation in accordance with method 800 at step 833. Otherwise, if the layout engine 112, at step 824, determines that the bounding region of the element 312 is not of sufficient size to display the figure, then the layout engine 112 proceeds to step 827 where the layout engine 112 displays the figure in the next element 312 of the flow and resizes the figure to fill the whole column of the next element 312. The layout engine 112 then terminates operation in accordance with method 800 at step 833.

If, however, at step 821 the layout engine 112 determines that the content type is not an inline figure, then the layout engine 112 proceeds to step 836 where the layout engine 112 determines whether the content type is media. If, at step 836, the layout engine 112 determines that the content type is media, then the layout engine 112 proceeds to step 842 where the layout engine 112 embeds the media type at the specified reference position. The layout engine 112 then terminates operation in accordance with method 800 at step 845. Otherwise, if the layout engine 112, at step 836, determines that the content type is not media, then the layout engine 112 proceeds to step 839 where the layout engine 112 generates an error indicating an invalid content type. The layout engine 112 then terminates operation in accordance with method 800 at step 845.

FIGS. 9A-9C display a flowchart representation of a method 900 of self-sizing elements 312 within the document layout in accordance with an exemplary embodiment of the adaptive grid-based document layout system and methods. The layout engine 112 supports elements 312 that automatically adjust their height to fit the document content 106. The automatic resizing of elements 312 depends on the content type.

After starting at step 901, the layout engine 112 proceeds to step 903 where the layout engine 112 determines whether the element 312 is an image element. If, at step 903, the layout engine 112 determines that the element 312 is an image element, then the layout engine 112 proceeds to step 906 where the layout engine 112 sets the constraint variables 418, 421 associated with the element 312 in order to provide the element 312 with the pixel dimensions of the image. Next, at step 909, the layout engine 112 computes the image's aspect ratio from the pixel dimensions to determine the appropriate height and width of the element 312. The layout engine 112 then terminates operation in accordance with method 900 at step 912.

If, however, at step 903 the layout engine 112 determines that the element 312 is not an image element, then the layout engine 112 proceeds to step 915 where the layout engine 112 determines whether the element 312 is a text element. If, at step 915, the layout engine 112 determines that the element 312 is a text element, then the layout engine 112 proceeds to step 918 where the layout engine 112 determines whether the element 312 comprises a predetermined mark or attribute, such as, but not limited to a "resize-to-content" tag. If, at step 918, the layout engine 112 determines that the element 312 is not marked with a "resize-to-content" tag, then the layout engine 112 terminates operation in accordance with method 900 at step 912, because no resizing of the element 312 is necessary.

If the layout engine 112, at step 918, determines that the element 312 is marked with a "resize-to-content" tag, then the layout engine 112 proceeds to step 921 where the layout engine 112 sets the height variable of the element 312 to the maximum allowable value. Next, at step 924, the layout engine 112 determines whether the element 312 is filled entirely with text. If, at step 924, the layout engine 112 determines that the element 312 is filled entirely with text, then the layout engine 112 terminates operation in accordance with method 900 at step 930, because no resizing of the element 312 is necessary. If, however, at step 924 the layout engine 112 determines that the element 312 is not filled entirely with text, then the layout engine 112 proceeds to step 927 where the layout engine 112 resets the height of the element 312 to the actual height of the text. The layout engine 112 then terminates operation in accordance with method 900 at step 930.

If, however, the layout engine 112 determines that element 312 is not a text element at step 915, then the layout engine 112 proceeds to step 927 where the layout engine 312 determines whether the element 312 is a compound element requiring templates 306 for layout. A content atom represents two or more pieces of content that, taken together, are considered to be an atomic unit. For example and not limitation, a picture and corresponding caption are conceptually grouped together as a single "captioned figure." Accordingly, a compound element is an element in a template that may accept a content atom. In order to layout the separate pieces of sub-content inside the content atom, the compound element specifies a separate sub-template that may be used to arrange the separate subparts of the content atom on the layout page. If, at step 927, the layout engine 112 determines that the element 312 is not a compound element requiring templates 306 for layout, then the layout engine 112 terminates operation in accordance with method 900 at step 930, because no resizing is required.

If, however, at step 927, the layout engine 112 determines that the element 312 is a compound element requiring templates 306 for layout, then the layout engine 112 proceeds to step 933 where the layout engine 112 uses the required templates 306 to layout the element 312. A compound element may include multiple content items 506 or multiple content streams 503, such as, but not limited to, a content atom 506A$_3$. Then, the layout engine 112 proceeds to step 936 where the layout engine 112 uses the special output variable 421 to set the final height of the element 312 within the template 306. The layout engine 112 then terminates operation in accordance with method 900 at step 939.

FIG. 10 displays a flowchart representation of a method 1000 of scoring a template 306 based on how well the document content 106 fits the template 306 in accordance with an exemplary embodiment of the adaptive grid-based document layout system and methods. For each template 306 used to layout document content 106, the layout engine 112 calculates a score based on how well the content fits the template 306. Once the layout engine 112 calculates the scores for all of the potential templates 306, the layout engine 112 reports the scores back to the paginator 109 which may use the scores, along with template scores for previous and subsequent pages of content, to calculate an optimal sequence of templates 306 to use for paginating all of the document content 106.

After starting at step 1001, the layout engine 112 proceeds to step 1003 where the layout engine 112 evaluates a constraint output variable 421 comprising a template score of the template 306. The layout engine 112 then proceeds to step 1006 where the layout engine 112 determines the number of widows and orphans within the page layout after applying the template 306. Then, at step 1009, the layout engine 112 calculates a score for how well the content fits the template 306, whereby the quality score is based on the template score variable and the number of widows and orphans in the page layout. The layout engine 112 proceeds to step 1012 where the layout engine 112 provides the paginator 109 with the calculated score of the template 306, which the paginator 109 uses in its calculation of the final sequence of templates 306. The paginator 109 then terminates operation in accordance with method 1000 at step 1015.

The paginator 109 produces a sequence of templates 306 and a mapping of document content 106 to each template 306 in the sequence which the layout engine 112 may use to display an entire document. In an embodiment of the adaptive grid-based document layout system and methods, the adaptive grid-based document system 103 utilizes multiple pagination algorithms for different applications. Accordingly, the adaptive grid-based document system 103 may comprise a first paginator 109 that quickly produces a valid pagination for interactive adaptation and a second paginator 109 that produces an optimal pagination, but requires more time to operate. The first paginator 109 might use a "greedy" algorithm that always uses the first template 306 for each page that will accept the content at the current location in the document or might choose the single best template 306 at each place in the sequence without evaluating the global consequences (e.g., global scoring) of the choice. The second paginator 109 might use techniques including, but not limited to, creating approximate optimal paginations superior to a "greedy" pagination, but not guaranteed to be optimal, by running a series of smaller optimization processes over smaller portions (e.g., "windows") of the document content 106.

FIGS. 11A-11D display a flowchart representation of a method 1100 of optimally paginating document content 106 into an adaptive grid-based document layout in accordance with an exemplary embodiment of the adaptive grid-based document layout system and methods. In order to find an optimal pagination, the paginator 109 must measure the effectiveness of each sequence of valid templates 306, whereby the measure is maximized by a systematic or heuristic search or by constraint optimization. An optimizing paginator 109 produces a sequence of templates 306 and a mapping of content onto each template 306, which maximizes some measure of quality. For example and not limitation, one such measure includes the "total page turns" metric, which counts the total number of page turns that would be required to both read through the text and turn to any additional content referenced by the text. In the exemplary embodiment of the adaptive grid-based document layout system and methods, a metric used to score the effectiveness of each sequence of valid templates 306 includes the use of the total number of page turns value with other measures that reflect the quality of the appearance of the page (e.g., empty spaces, aesthetic look, workability, or readability).

As the basic dynamic programming algorithm used to evaluate subproblems (e.g., new templates 306 in a series) relies on hindsight to score sequences of subproblems, the adaptive grid-based document layout system and methods restructure the algorithm so that the evaluation is performed only for valid pages by calculating all possible endpoints of a current subproblem (e.g., forward-looking). The adaptive grid-based document layout system and methods ensures that when a new subproblem is considered, all subproblems that could possibly precede it in a solution will have already been solved, and the entry pointing back to the optimal predecessor will be in a data table. Consequently, if no entry in a data table exists for a subproblem when it is reached, then the subproblem may be passed over with no computation.

Additionally, an embodiment of the adaptive grid-based document layout system and methods may easily be modified to handle additional content streams 503 by adding extra dimensions to the data table and additional nested loops to the algorithm. Optional content streams 503 may also be processed with no additional programming by having templates 306 available that display content from optional content streams 503. The paginator 109 includes content items 506 from the optional content streams 503 whenever they improve the optimal pagination. Such optional content streams 503 and templates 306, which use optional content streams 503, may vastly improve pagination quality.

Performance of the adaptive grid-based document layout system and methods is further improved by pruning partial solutions (e.g., subproblems already verified to be acceptable) from the data table whose quality score is worse than some threshold (e.g., sometimes referred to herein as a "pruning threshold"). Because relatively few acceptable solutions exist, this pruning helps to narrow the list of subproblem sequences down to the most optimal. For example and not limitation, a conservative pruning strategy includes the use of the quality score resulting from a "first-fit" solution (e.g., "greedy" solution) as the pruning threshold. Use of such a conservative pruning strategy typically provides a significant speedup of the pagination process and guarantees that a solution will always be found. Alternatively, an optimistic pruning strategy chooses an approximate, near-perfect threshold and iteratively alters the threshold if no solution is found. When a significant number of templates 306 exist in the template storage unit 118, the likelihood that a near-perfect solution exists is high and, therefore, the optimistic pruning strategy becomes more effective.

Entries within the data table represent locations in the document (e.g., endpoints of the page currently being processed). Further, an entry in the data table represents the best pagination discovered so far that ends at the given location in the document's various content streams 503, which may be determined by an index value of the entry in the table. The table entry includes, but is not limited to, the location in the table (and, therefore, the location in the document) of the preceding page in the optimal partial-solution ending at that location, and the template 306 used to render the last page (e.g., the page between the previous table entry and the table entry currently being processed).

The outermost loop of the process used by the adaptive grid-based document layout system and methods traverse through the table, evaluating larger and larger (partial) solutions or subproblems as it proceeds. Each iteration of the loop calls the layout engine 112 to find the next set of pages (e.g., a page is a template 306 and a selection of content; there may exist multiple results for a single template 306 with different amounts of text, different image versions, etc.) which may follow the current endpoint under consideration. The resulting set of pages yields a set of endpoints for the next page, which are then propagated forward by the paginator 109 into the data table (e.g., replacing the existing entries, if the new entry has a better global score).

For example and not limitation, the method 1100 described in FIGS. 11A-11D may be represented by the pseudo-code provided in TABLE 1.

TABLE 1

BEGIN PAGINATE;
    Initialize Endpoint Table (place one entry at location (0,0) for beginning of document);
    FOR each table location DO:
        IF location contains valid entry THEN:
            CALL LAYOUT ENGINE to generate list of endpoints for pages starting at current table location;
            FOR each endpoint returned (new) DO:
                Calculate global score for sequence ending with new endpoint;
                IF score is better than Pruning Threshold THEN:

TABLE 1-continued

```
            IF new endpoint has no entry in table THEN:
                Add entry for new endpoint containing
                score, template, and back pointer to
                location;
            ELSE (new endpoint does have previous entry
            in table) THEN:
                Compare score with existing entry's
                score in table;
                IF score is better than existing
                entry's score THEN:
                    Replace entry in table with new
                    score, template, and back
                    pointer to location;
                ENDIF;
            ENDIF;
        ENDIF;
      ENDFOR;
    ENDIF;
  ENDFOR;
  Trace back pointers from last table entry to obtain template
sequence                         and content mapping;
END PAGINATE;
```

After starting at step 1101, the paginator 109 proceeds to step 1103 where the paginator 109 sets the pruning threshold for optimal pagination. One skilled in the art will recognize that a threshold value may be determined in a variety of ways, including the techniques described above.

Next, at step 1106, the paginator 109 initializes the empty data table with a single endpoint representing the beginning of the first page of the document (e.g., placing one entry at location (0, 0) to represent the beginning of the document). The paginator 109 then proceeds to step 1109 where the paginator 109 determines whether any locations within the table need to be evaluated. If, at step 1109, the paginator 109 determines that no locations within the table need to be evaluated, then the paginator 109 proceeds to step 1121 where the paginator 109 traces the back pointers from the last table entry to obtain the optimal template 306 sequence and content mapping. The paginator 109 then terminates operation in accordance with method 1100 at step 1101.

If, however, the paginator 109, at step 1109, determines that locations within the table need to be evaluated, then the paginator 109 proceeds to step 1112 where the paginator 109 determines whether the current table location has a valid entry. The current entry is chosen by the paginator from the set of unevaluated table entries for which all entries preceding it in the table have been evaluated. If, at step 1112, the paginator 109 determines that the current table entry does not have a valid entry, then the paginator 109 marks the entry as evaluated and proceeds to step 1109, described above. Otherwise, if the paginator 109, at step 1112, determines that the current table entry has a valid entry (e.g., an acceptable entry representing templates that may be successfully applied to the document content), then the paginator 109 proceeds to step 1115 where the paginator 109 calls the layout engine 112 to generate a list of endpoints for pages starting at the current table location.

Generally, through a call to a program module, the layout engine 112 applies each of the templates 306 within the template storage unit 118 to the unprocessed portion of the document content 106 to determine which templates 306 are valid templates 306. If none of the templates 306 may be used, then no templates 306 may follow the current table location and, therefore the current table entry should not be considered any further. When the layout engine 112 determines that a template 306 may be applied a the current location (e.g., it will accommodate the content beginning at the current table location), then the layout engine 112 applies the template to the content to determine the endpoint and score of the resulting page and includes the endpoint in the list of endpoints returned to the paginator 109, which may determine the appropriate global score associated with the new sequence of templates 306.

The paginator 109 then proceeds to step 1118 where the paginator 109 determines whether any endpoints returned in step 1115 need to be evaluated (e.g., whether there is a calculated global score for the endpoint). If, at step 1118, the paginator 109 determines that no endpoints need to be evaluated, then the paginator 109 proceeds to step 1109, described above. If, however, the paginator 109, at step 1118, determines that endpoints need to be evaluated, then the paginator 109 proceeds to step 1127 where the paginator 109 calculates the global score for the sequence ending with the new endpoint. The paginator 109 then proceeds to step 1130 where the paginator 109 determines whether the calculated global score is better than the predetermined pruning threshold. If, at step 1130 the paginator 109 determines that the calculated global score is not better than the predetermined pruning threshold, then the paginator 109 proceeds to step 1118, described above.

If, however, the paginator 109, at step 1130, determines that the calculated global score is better than (e.g., greater than) the predetermined pruning threshold, then the paginator 109 proceeds to step 1133 where the paginator 109 determines whether the new endpoint has an entry in the data table. If, at step 1133, the paginator 109 determines that the new endpoint does not have an entry in the data table, then the paginator 109 proceeds to step 1136 where the paginator 109 adds the entry into the table for the new endpoint, containing the calculated global score, current template 306, and a back pointer to the current location. Then, the paginator 109 proceeds to step 1118, described above.

Otherwise, if the paginator 109, at step 1133, determines that the new endpoint does have an entry in the data table, then the paginator 109 proceeds to step 1139 where the paginator 109 determines whether the calculated global score is better than the score stored in the data table. If, at step 1139, the paginator 109 determines that the calculated global score is not better than the score stored in the data table, then the paginator 109 proceeds to step 1118, described above.

If, however, the paginator 109, at step 1139, determines that the calculated global score is better than the score stored in the data table, then the paginator 109 proceeds to step 1142 where the paginator 109 replaces the entry stored in the data table with the new endpoint, calculated global score, current template 306, and a back pointer to the current location. Next, the paginator 109 proceeds to step 1118, described above.

In the exemplary embodiment of the adaptive grid-based document layout system and methods, the paginator 109 may determine endpoints (e.g., a template 306 that may appropriately be applied to a portion of the remaining document content 106) by use of a FindValueEndingPoints( ) program module. Given the starting point and the number of figures to be placed on a page, the paginator 109, through a call to the above-mentioned program module in the layout engine 112, enumerates each template 306 that may appropriately produce the next page of document layout. The paginator 109 uses a call to the program module for enumerating the valid template 306 choices and returning a vector of valid ending points together with the template 306 used to arrive at each ending point and a quality score for the resulting layout. The quality score may reflect the template's 306 output score, the presence of widows and orphans, and any other measure of layout quality, such as penalties for under-filled pages.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method of applying document content to adaptive templates, comprising:
   calculating a template score for a template based on how well the document content fits the template to determine whether to include the template in an appropriate set of templates;
   determining the size and position of an element within a template of the set of templates;
   calculating two-dimensional regions of a layout page;
   reducing the size of the two-dimensional regions according to element overlap and z-ordering;
   inserting document content into the two-dimensional regions; and
   paginating the document content by using the template score along with a previous template score for a previous page of content and a subsequent template score for a subsequent page of content to calculate an optimal sequence of the appropriate set of templates.

2. The method of claim 1, wherein determining the size and position of an element within a template of the set of templates further comprises propagating the size and position of each element within the template by utilizing a template constraint graph.

3. The method of claim 1, wherein selecting the appropriate set of templates further comprises:
   analyzing content preconditions of each template against the document content; and
   evaluating value preconditions of each template against a plurality calculated constraint values respectively associated with each template.

4. The method of claim 3, wherein the selecting the appropriate set of templates further comprises accepting a plurality of templates with successfully evaluated content preconditions and value preconditions.

5. The method of claim 1, wherein inserting document content into the two-dimensional regions further comprises:
   determining whether the document content is an image; and
   if the document content is an image, further comprising:
      scaling the image to fit a content region of the element; and
      displaying the image inside the content region of the element.

6. The method of claim 5, further comprising:
   determining whether the document content comprises audio;
   if the document content comprises audio, further comprising embedding a visual representation of the audio at a specified position in the content region of the element;
   determining whether the document content comprises video; and
   if the document content comprises video, further comprising embedding the video at a specified position in the content region of the element.

7. The method of claim 1, wherein inserting document content into the two-dimensional regions further comprises:
   determining whether the document content is text; and
   if the document content is text, further comprising inserting the text into the content region of the element using a line-breaking algorithm.

8. The method of claim 7, wherein inserting the text into the content region of the element using a line-breaking algorithm further comprises inserting the text into the content region of the element using an optimal line-breaking algorithm.

9. The method of claim 1, wherein inserting document content into the two-dimensional regions further comprises:
   determining whether the document content is an inline figure; and
   if the document content is an inline figure, further comprising placing the inline figure at a specified position in the content region of the element, wherein the specified position is determined by the placement of previous content in the element.

10. The method of claim 9, further comprising scaling the inline figure to fill the width of a column within the content region of the element.

11. A computer-readable medium having computer-executable instructions for applying document content to adaptive templates, the computer-executable instructions comprising:
    calculating a template score for a template based on how well the document content fits the template to determine whether to include the template in an appropriate set of templates;
    determining the size and position of an element within a template of the set of templates;
    calculating two-dimensional regions of a layout page;
    reducing the size of the two-dimensional regions according to element overlap and z-ordering;
    inserting document content into the two-dimensional regions; and
    paginating the document content by using the template score along with a previous template score for a previous page of content and a subsequent template score for a subsequent page of content to calculate an optimal sequence of the appropriate set of templates.

12. The computer-readable medium of claim 11, wherein determining the size and position of an element within a template of the set of templates further comprises propagating the size and position of each element within the template by utilizing a template constraint graph.

13. The computer-readable medium of claim 11, wherein selecting the appropriate set of templates further comprises:
    analyzing content preconditions of each template against the document content; and
    evaluating value preconditions of each template against a plurality calculated constraint values respectively associated with each template.

14. The computer-readable medium of claim 13, wherein selecting the appropriate set of templates further comprises accepting a plurality of templates with successfully evaluated content preconditions and value preconditions.

15. The computer-readable medium of claim 14, further comprising:
    determining whether the document content comprises audio;
    if the document content comprises audio, further comprising embedding a visual representation of the audio at a specified position in the content region of the element;
    determining whether the document content comprises video; and if the document content comprises video, further comprising embedding the video at a specified position in the content region of the element.

16. The computer-readable medium of claim 11, wherein inserting document content into the two-dimensional regions further comprises:
   determining whether the document content is an image;
   if the document content is an image, further comprising:
   scaling the image to fit a content region of the element; and
   displaying the image inside the content region of the element;
   determining whether the document content is text; and
   if the document content is text, further comprising inserting the text into the content region of the element using a line-breaking algorithm.

17. The computer-readable medium of claim 16, wherein inserting the text into the content region of the element using a line-breaking algorithm further comprises inserting the text into the content region of the element using an optimal line-breaking algorithm.

18. The computer-readable medium of claim 11, wherein inserting document content into the two-dimensional regions further comprises:
   determining whether the document content is an inline figure; and
   if the document content is an inline figure, further comprising placing the inline figure at a specified position in the content region of the element, wherein the specified position is determined by the placement of previous content in the element.

19. The computer-readable medium of claim 18, further comprising scaling the inline figure to fill the width of a column within the content region of the element.

20. A method of automatically resizing elements in a document, comprising:
   determining whether the element is a compound element;
   if the element is a compound element, further comprising:
      calculating a template score for a template based on how well the elements in the document fit the template to determine whether to include the template in a set of templates;
   using the set of templates to layout the element, wherein a template of the set of templates includes a dimension variable having a value;
   setting a dimension of the element to the value of the dimension variable; and
   paginating the document content by using the template score along with a previous template score for a previous page of content and a subsequent template score for a subsequent page of content to calculate an optimal sequence of the set of templates.

* * * * *

UNITED STATES PATENT AND TRADEMARK OFFICE
CERTIFICATE OF CORRECTION

PATENT NO.       : 8,091,021 B2                                      Page 1 of 1
APPLICATION NO.  : 11/778584
DATED            : January 3, 2012
INVENTOR(S)      : David Bargeron et al.

It is certified that error appears in the above-identified patent and that said Letters Patent is hereby corrected as shown below:

In Face page, under "Related U.S. Application Data" column 1, line 3, below "7,246,311."
insert -- (60) Provisional application No. 60/488,169, filed on Jul. 17, 2003. --, therefor.

Signed and Sealed this
Twenty-first Day of February, 2012

David J. Kappos
*Director of the United States Patent and Trademark Office*